United States Patent
Ishii et al.

(10) Patent No.: US 7,464,048 B2
(45) Date of Patent: Dec. 9, 2008

(54) SYSTEM, METHOD, AND PROGRAM STORAGE MEDIUM FOR MANAGING PRINTING APPARATUSES

(75) Inventors: Hiroaki Ishii, Tokyo (JP); Toshio Honma, Kawasaki (JP); Shigeru Ueda, Musashino (JP); Hironobu Araki, Tokyo (JP); Yoshinori Ikeda, Kawasaki (JP); Naoji Hayakawa, Machida (JP); Masanori Miyata, Yokohama (JP); Hiroshi Omura, Inagi (JP); Hirokazu Uchio, Tokyo (JP); Kengo Kawamoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1385 days.

(21) Appl. No.: 09/779,643

(22) Filed: Feb. 9, 2001

(65) Prior Publication Data

US 2001/0034745 A1 Oct. 25, 2001

(30) Foreign Application Priority Data

Feb. 10, 2000 (JP) ............................. 2000-033300
Feb. 10, 2000 (JP) ............................. 2000-033301
Jan. 31, 2001 (JP) ............................. 2001-023845

(51) Int. Cl.
*G06Q 30/00* (2006.01)
(52) U.S. Cl. ................. 705/26; 705/1; 705/29; 399/8
(58) Field of Classification Search ............ 705/26, 705/27
See application file for complete search history.

(56) References Cited

U.S. PATENT DOCUMENTS

| | | | | |
|---|---|---|---|---|
| 5,381,242 A | * | 1/1995 | Fujii | 358/468 |
| 5,383,129 A | * | 1/1995 | Farrell | 705/400 |
| 5,537,626 A | * | 7/1996 | Kraslavsky et al. | 710/8 |
| 5,708,909 A | * | 1/1998 | Yamashita et al. | 399/8 |
| 5,715,496 A | * | 2/1998 | Sawada et al. | 399/8 |
| 5,956,698 A | * | 9/1999 | Lacheze et al. | 705/34 |
| 6,052,547 A | * | 4/2000 | Cuzzo et al. | 399/79 |
| 6,405,178 B1 | * | 6/2002 | Manchala et al. | 705/29 |
| 6,795,829 B2 | * | 9/2004 | Alsop et al. | 707/102 |

(Continued)

OTHER PUBLICATIONS

Author unknown, "Lexmark launches marktrack printer software to slash printing costs," M2 Presswire, Coventry, Sep. 10, 1999, p. 1.*

*Primary Examiner*—Jeffrey A. Smith
*Assistant Examiner*—Jason B. Dunham
(74) *Attorney, Agent, or Firm*—Fitzpatrick, Cella, Harper & Scinto

(57) ABSTRACT

There is disclosed an invention for generating contract information for an image forming apparatus for which the user is going to conclude a contract. The history information of an image forming apparatus used by the user and having a contract history is stored and managed in correlation with the user. Such management is executed in a center server capable communication with the image forming apparatus through a predetermined communication channel. The above-mentioned information includes contract term, machine type, number of print outputs etc. of the image forming apparatus. Also the image forming apparatus to be managed includes that currently contracted and that contracted in the past. In case the user wishes to conclude a new contract for an image forming apparatus, new contract information is generated according to the history information managed by the center server in correlation with the user. This invention provides a system capable of realizing the foregoing.

11 Claims, 25 Drawing Sheets

U.S. PATENT DOCUMENTS

| | | |
|---|---|---|
| 6,937,997 B1 * | 8/2005 | Parulski .................... 705/26 |
| 2001/0037267 A1 * | 11/2001 | Sato et al. .................. 705/29 |
| 2003/0187687 A1 * | 10/2003 | Miwa ......................... 705/1 |
| 2004/0167839 A1 * | 8/2004 | Amemiya .................. 705/35 |

* cited by examiner

FIG. 10
CHARGE TABLE

FOR MACHINE A

| NO. OF COPIES | COLOR COPY | COLOR PRINT | BLACK COPY/PRINT |
|---|---|---|---|
| 1 — La | $ Aa/COUNT | $ Da/COUNT | $ Ga/COUNT |
| La+1 — Ma | $ Ba/COUNT | $ Ea/COUNT | $ Ha/COUNT |
| Ma+1 — | $ Ca/COUNT | $ Fa/COUNT | $ Ia/COUNT |

FOR MACHINE B

| NO. OF COPIES | COLOR COPY | COLOR PRINT | BLACK COPY/PRINT |
|---|---|---|---|
| 1 — Lb | $ Ab/COUNT | $ Db/COUNT | $ Gb/COUNT |
| Lb+1 — Mb | $ Bb/COUNT | $ Eb/COUNT | $ Hb/COUNT |
| Mb+1 — | $ Cb/COUNT | $ Fb/COUNT | $ Ib/COUNT |

FIG. 13

| MACHINE | COLOR COPY | COLOR PRINT | BLACK COPY/PRINT |
|---------|------------|-------------|------------------|
| A | A1 | A2 | A3 |
| B | B1 | B2 | B3 |
| TOTAL | A1+B1 | A2+B2 | A3+B3 |

$$\begin{pmatrix} A1, A2, A3 > Ma \\ B1, B2, B3 > Mb \end{pmatrix}$$

FIG. 14

FOR MACHINE A, B

| MACHINE | COLOR COPY | COLOR PRINT | BLACK COPY/PRINT |
|---------|------------|-------------|------------------|
| A | A1 | A2 | A3 |
| B | B1 | B2 | B3 |
| TOTAL | A1+B1 | A2+B2 | A3+B3 |

$$\begin{pmatrix} A1, A2, A3 > Ma \\ B1, B2, B3 > Mb \end{pmatrix}$$

FOR MACHINE C, D

| MACHINE | COLOR PRINT | BLACK PRINT |
|---------|-------------|-------------|
| C | C2 | C3 |
| D | D2 | D3 |
| TOTAL | C2+D2 | C3+D3 |

FIG. 19

| TOTAL NO. OF PRINTS | $/PRINT |
|---|---|
| — 999 | N |
| 1000 — 2999 | N-1 |
| 3000 — 9999 | N-2 |
| 10000 — | N-3 |

| TOTAL NO. OF PRINTS | $/PRINT |
|---|---|
| — 999 | N-1 |
| 1000 — 2999 | N-2 |
| 3000 — 9999 | N-3 |
| 10000 — | N-4 |

| CONTRACT ID 2201 | MACHINE ID 2202 | MACHINE S/N 2203 | START OF USE 2204 | END OF CONTRACT 2205 | USE HISTORY 2206 | CONTINUATION TERM 2207 | NEW TERM 2208 | RECOMMENDATION FLAG 2209 |
|---|---|---|---|---|---|---|---|---|
| P001 | CP100 (COLOR PRINTER) | 1234567 | 1998/4/1 | EFFECTIVE | 10000 PRINTS/YEAR | $ (N-1)/PRINT | $ N | |
| P002 | BP200 (BLACK/WHITE PRINTER) | 2345678 | 1999/4/1 | EFFECTIVE | 20000 PRINTS/YEAR | $ (N-1)/PRINT | $ N | |
| P003 | BC300 (BLACK/WHITE COPIER) | 3456789 | 1998/4/1 | EFFECTIVE | 30000 PRINTS/YEAR | $ (N-2)/PRINT | $ N | |
| P004 | BP400 (BLACK/WHITE PRINTER) | 4567890 | 1997/4/1 | EFFECTIVE | 40000 PRINTS/YEAR | $ (N-3)/PRINT | $ N | * |
| P005 | BP200 (BLACK/WHITE PRINTER) | 2345679 | 1999/4/1 | EFFECTIVE | 15000 PRINTS/YEAR | $ (N-1)/PRINT | $ N | |
| P006 | BP200 (BLACK/WHITE PRINTER) | 2345680 | 1994/4/1 | 1998/12/31 | 10000 PRINTS/YEAR | $ (N-1)/PRINT | $ N | |

FIG. 23

| CONTRACT ID 2301 | MACHINE ID 2302 | MACHINE S/N 2303 | START OF USE 2304 | END OF CONTRACT 2305 | USE HISTORY 2306 | CONTINUATION TERM 2307 | NEW TERM 2308 | POINT 2309 |
|---|---|---|---|---|---|---|---|---|
| P001 | CP100 (COLOR PRINTER) | 1234567 | 1998/4/1 | EFFECTIVE | 10000 PRINTS/YEAR | $ (N-1)/PRINT | $ N | 100 |
| P002 | BP200 (BLACK/WHITE PRINTER) | 2345678 | 1999/4/1 | EFFECTIVE | 20000 PRINTS/YEAR | $ (N-1)/PRINT | $ N | 200 |
| P003 | BC300 (BLACK/WHITE COPIER) | 3456789 | 1998/4/1 | EFFECTIVE | 30000 PRINTS/YEAR | $ (N-2)/PRINT | $ N | 300 |
| P004 | BP400 (BLACK/WHITE PRINTER) | 4567890 | 1997/4/1 | EFFECTIVE | 40000 PRINTS/YEAR | $ (N-3)/PRINT | $ N | 400 |
| P005 | BP200 (BLACK/WHITE PRINTER) | 2345679 | 1999/4/1 | EFFECTIVE | 15000 PRINTS/YEAR | $ (N-1)/PRINT | $ N | 150 |
| P006 | BP200 (BLACK/WHITE PRINTER) | 2345680 | 1994/4/1 | 1998/12/31 | 10000 PRINTS/YEAR | $ (N-1)/PRINT | $ N | 100 |

FIG. 24

| FROM/TO | CP100<br>(COLOR PRINTER) | BP200<br>(BLACK/WHITE PRINTER) | BC300<br>(BLACK/WHITE COPIER) |
|---|---|---|---|
| CP100<br>(COLOR PRINTER) | ×1 | ×2 | ×4 |
| BP200<br>(BLACK/WHITE PRINTER) | ×0.5 | ×1 | ×2 |
| BC300<br>(BLACK/WHITE COPIER) | ×0.25 | ×0.5 | ×1 |

FIG. 25

| POINT | DISCOUNT ($) |
|---|---|
| — 99 | 1 |
| 100 — 199 | 2 |
| 200 — 299 | 3 |
| 300 — 399 | 4 |
| 400 — 499 | 5 |

FIG. 26

| NO. OF COPIES | COLOR COPY | COLOR PRINT | BLACK COPY/PRINT |
|---|---|---|---|
| 1 — La | $ (Aa−3)/COUNT | $ (Da−3)/COUNT | $ (Ga−3)/COUNT |
| La+1 — Ma | $ (Ba−3)/COUNT | $ (Ea−3)/COUNT | $ (Ha−3)/COUNT |
| Ma+1 — | $ (Ca−3)/COUNT | $ (Fa−3)/COUNT | $ (Ia−3)/COUNT |

US 7,464,048 B2

SYSTEM, METHOD, AND PROGRAM STORAGE MEDIUM FOR MANAGING PRINTING APPARATUSES

BACKGROUND OF THE INVENTION

1. Field of the Invention

The present invention relates to an information processing apparatus, an information processing method and a program storage medium, and more particularly to an information processing apparatus, an information processing method and a program storage medium having a function for processing information relating to an information handling equipment.

2. Related Background Art

With the recent progress in networking, the information handling equipment such as copying machines, printers, personal computers etc. used in business environment are often connected by a network and the printing is frequently executed by a remote operation.

On the other hand, the function and status of such information handling equipment are different in each equipment, and are difficult to manage or maintain on collective basis. Particularly in the electrophotographic copying machine or printer, the replacement of the photosensitive drum, the repair, inspection, adjustment of the function etc. cannot be easily managed on collective basis, thus resulting in a loss in the service efficiency or in complication of expense billing.

Furthermore, a unified management has not been realized for the service providing for the information handling equipment used in the network environment and the billing for such service providing. For this reason, there has been required an enormous human resources for correlating the service and the billing therefor.

On the other hand, for the information handling equipment having the printing function, the maintenance service for maintaining such printing function is included in the management of the management, but the contract relating to such service has been prepared by personal works through documents, telephone conversation etc. For this reason, the office works required until the contract is made have involved a lot of human resources. The information handling equipment with printing function are diversified such as the monochromatic printing equipment, color printing equipment etc. and it has been difficult to provide diversified services suitable for such diversified equipment.

Also at the side of receiving the management service, it has been difficult to pay attention to each equipment in case various plural information handling equipment are managed for example in an office. As a result, for example in a maintenance contract, it has been difficult to achieve flexible management such as reaching a contract suitable for each kind of the equipment in consideration of the content of the service, the period and cost of the contract etc.

SUMMARY OF THE INVENTION

In consideration of the foregoing, an object of the present invention is to provide an information processing apparatus, an information processing method, a program storage medium and a program allowing efficient maintenance and management of plural information handling equipment (hereinafter also represented as information equipment) functioning in a network environment, and, more specifically, to provide an information processing apparatus, an information processing method, a program storage medium and a program allowing to form, for the information equipment, a maintenance agreement that is more advantageous for the user of such equipment and that is also efficient for the manager of the information equipment at the user side and for the provider of the maintenance service.

The above-mentioned object can be attained, according to the present invention, by an information processing apparatus connected through the internet to a first device having a display unit, the information processing apparatus comprising transmission means to be used by the user for transmitting contract setting image information for preparing a contract for a second device prior to the purchase of the second device by the user, reception means for receiving a first ID for specifying the first device and a second ID for specifying the second device, transmitted through the internet, search means for searching first contract information corresponding to the first ID information received by the reception means, and generation means for generating second contract information corresponding to the second device, based on the first contract information searched by the search means.

According to the present invention, there is also provided an information processing apparatus for generating contract information including charge amount information per a print output of an image information apparatus, the information processing apparatus comprising reception means for receiving, through a predetermined communication medium, the use status information of a first image forming apparatus owned by the user, calculation means for calculating a number of points according to the received use status information, and calculation means for calculating a charge amount per a print output according to the number of points and including a discount amount for a second image forming apparatus constituting the object of a new contract.

According to the present invention, there is also provided an information processing apparatus capable of communicating, through the internet, with plural image forming apparatus respectively corresponding to identifiers and of respectively managing such image forming apparatus, the information processing apparatus comprising calculation means for receiving the use status of each of the plural image forming apparatus, transmitted through the internet, and calculating a number of points corresponding to the received use status, wherein the calculation means calculates, according to the calculated number of points, a discount amount of the contract for an image forming apparatus constituting the object of a new contract.

According to the present invention, there is also provided an information processing apparatus for generating first contract information for a first printing apparatus connected to a management apparatus of the user, the information processing apparatus comprising recognition means for recognizing the presence or absence of contract information corresponding to the identifier of the user, and selection means for selecting a first charge table in case the recognition means recognizes the presence of the contract information corresponding to the identifier of the user, or a second charge table in case the recognition means recognizes the absence of the contract information corresponding to the identifier of the user.

According to the present invention, there is also provided an information processing apparatus capable of bidirectional communication with printing apparatus of the user through a predetermined communication medium, the information processing apparatus comprising reception means for receiving information indicating the use status information of a first printing apparatus, and generation means for generating contract information of a second printing apparatus according to the use status information of the first printing apparatus, wherein the contract information includes information of the charge amount per a print output of the printing apparatus, and the charge amount per a print output includes a maintenance charge of the printing apparatus.

Another object of the present invention is to provide an information processing apparatus, an information processing method, a program storage medium and a program enabling efficient maintenance and management of plural information equipment functioning in a network environment, and still another object of the present invention is to provide an information processing apparatus, an information processing method, a program storage medium and a program enabling efficient unified management, for plural information equipment connected to a first network, from the maintenance of such information equipment to the billing therefor by an information processing apparatus connected to a second network capable of communicating with the first network through a predetermined communication medium.

The above-mentioned objects can be attained, according to the present invention, by an information processing apparatus connected to a second network capable of communicating, through a predetermined communication channel, with a first network to which plural information equipment are connected, the information processing apparatus comprising reception means for receiving first information relating to the use status of the information equipment through the predetermined communication channel, first output means for outputting information designating the prevision of a service for the information equipment based on the first information, and second output means for outputting billing amount information for billing, for the provided service, to the user of the first network.

Still other objects of the present invention, and the features thereof, will become fully apparent from the following detailed description and the appended claims.

BRIEF DESCRIPTION OF THE DRAWINGS

FIG. 10 is a view showing an example of the charge table;

FIG. 13 is a view showing an example of charge calculation in a maintenance management contract for paying a maintenance charge according to the number of prints;

FIG. 14 is a view showing an example of calculation of a total billed sum of a month for the user company provided with the system shown in FIG. 1;

FIGS. 19 and 20 are views showing examples of the charge table;

FIGS. 22 and 23 are views showing examples of display of a contract history list;

FIG. 24 is a view showing an example of a point conversion table;

FIG. 25 is a view showing an example of a table for converting points into a discount amount;

FIG. 26 is a view showing an example of the charge amount per a print output;

DESCRIPTION OF THE PREFERRED EMBODIMENTS

First embodiment

In the following the present invention will be explained by an embodiment thereof, with reference to the accompanying drawings.

(System outline)

At first there will be explained, with reference to FIGS. 1 and 2, the configuration of an information equipment system adapted for applying the present invention.

Figure 1:
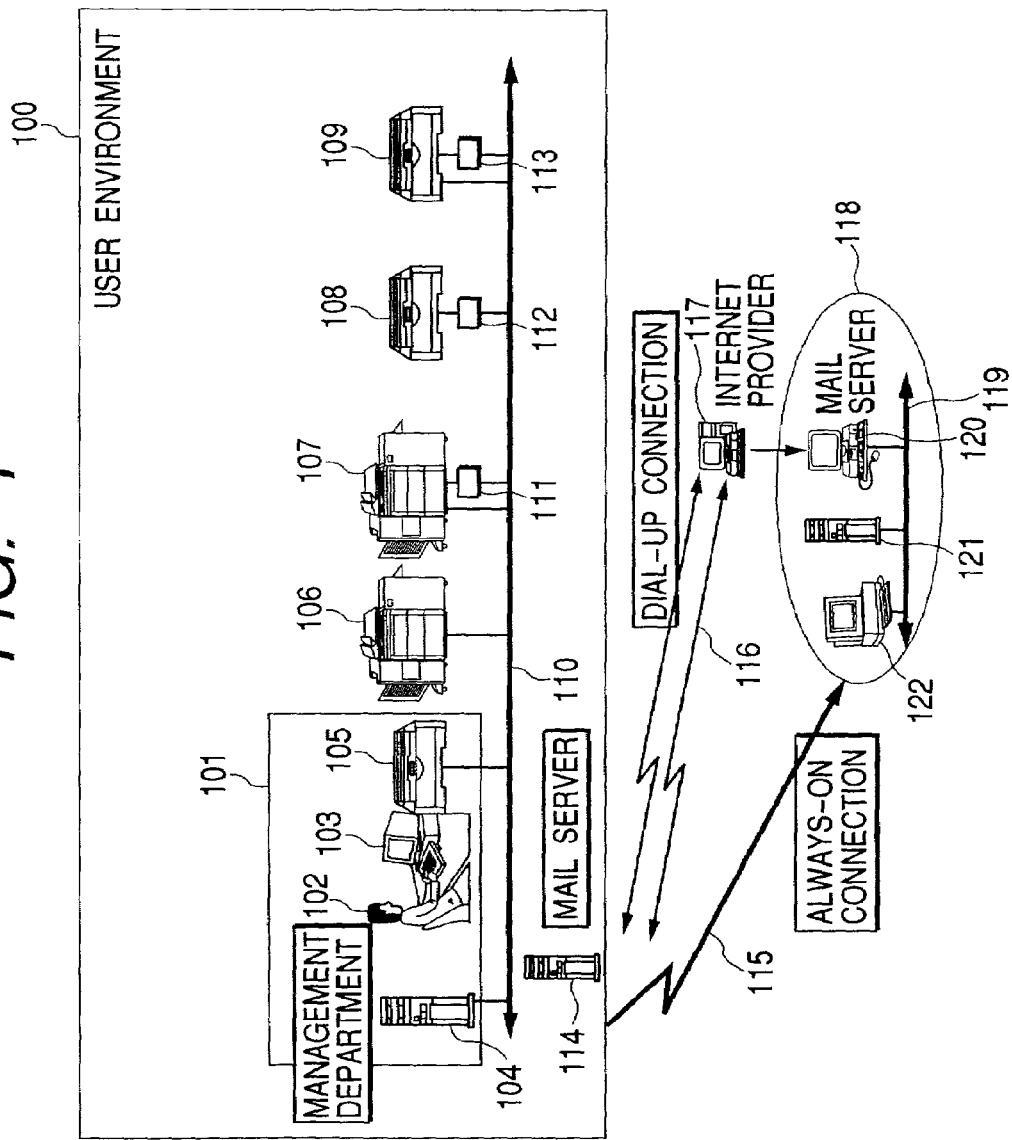
FIG. 1 is a schematic view showing the electronic maintenance utilizing a system of the information equipment, embodying the present invention.

FIG. 1 is a view showing the outline of electronic maintenance utilizing the information equipment system of the present embodiment.

Referring to FIG. 1, there are shown a user 100 of information equipment such as a business firm or an official organization, utilizing a plurality of information equipment linked in a network; a management department 101 of the user 100, managing plural information equipment as will be explained later; an operator 102 in charge of the management department 101; a terminal PC for the operator 102; a management server 104 of the management department; and a PC peripheral equipment 105 of the management department.

A copying machine 106 (machine A to be explained later) installed in a department 1 is capable of color copying, color printing and black copy/printing. It is connected to a network 110 through a standardized interface and can from time to time transmit information such as the number of copies or prints, or work status to the management server 104.

A copying machine 107 (machine B to be explained later) installed in a division 2 and similar to the copying machine 106 is connected to the network 110 through an interface board 111 for matching with the standardized interface. Through the interface board 111, it can transmit information such as the number of copies or prints, or the work status to the management server 104.

A printer 108 (machine C to be explained later) installed in a department 3 is capable of color printing and black printing. The printer uses a toner cartridge and is basically made maintenance free. It is connected to the network 110 through an interface board 112 similar in function to the interface board 111, and is thus capable of transmitting information such as the number of prints or work status to the management server 104.

A printer 109 (machine D to be explained later) installed in a department 4 and similar to the printer 108 is connected to the network 110 through an interface board 113.

A main server 114 can be used for communication with the exterior of the user 100, such as transmission of the information on the network 110 to the exterior. There are also shown an exclusive line 115 for enabling real-time communication of information between the information equipment such as the copying machine or the printer and a sales company 118 handling the services such as the maintenance service, and an internet 116 for executing dial-up communication with the sale company 118 through an internet provider 117.

There are further shown an internal network 119 of the sales company 118, a mail server 120 for enabling the internet communication, a management server 121 of the sale company 118, and a terminal PC for management of the sales company 118.

The information on the use status of the information equipment at the user 100 is accumulated in the management department 101 of the user 100 and is then suitably transferred to the sales company. Such centralized management allows to realize efficient maintenance/management service.

Figure 2:
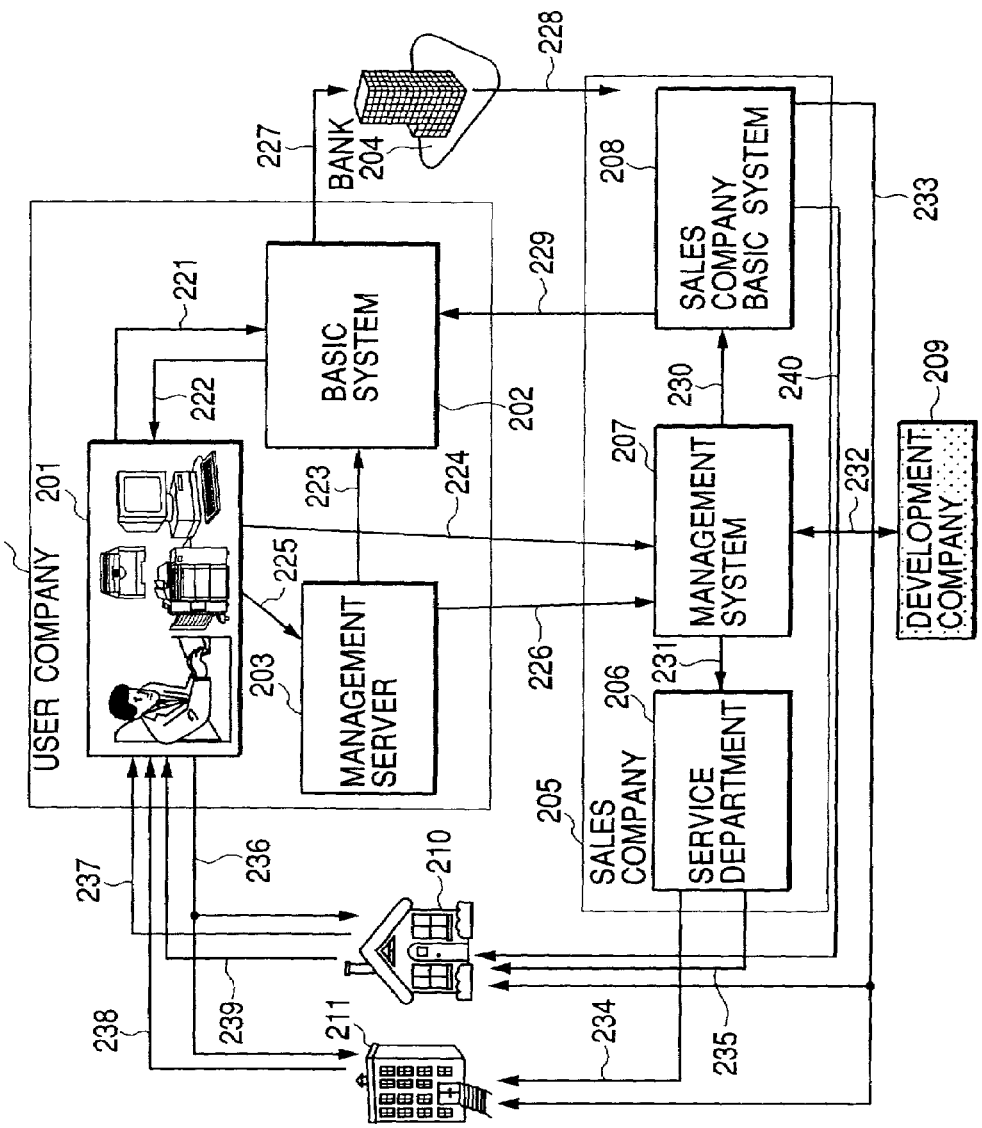
FIG. 2 is a detailed view showing the electronic maintenance utilizing the system of the information equipment shown in FIG. 1.

FIG. 2 is a detailed view of the electronic maintenance utilizing the information equipment system shown in FIG. 1.

Referring to FIG. 2, a user company 200 corresponds to the user 100 shown in FIG. 1. The user company 200 includes a user department 201, a basic system 202, and a management server 203 (corresponding to 104 in FIG. 1).

From each information equipment of the user department, equipment information 225 such as the number of copies, remaining amount of toner and equipment status is transmitted through the internal network to the management server 203. The equipment information 225 is transmitted, together with service order information etc., as information 226 to a sales company 205 to be explained later, through the aforementioned exclusive line 115 or the internet 116.

Charge information 223 for the services provided to the departments is transmitted from the management server 203 to the basic system 202.

In response to the charge information 223, the basic system 202 executes billing 222 to each department, and recovers a billed amount 222. Such settlement by the basic system can be executed by an existing accounting system.

A sales company 205 undertakes services such as sales and maintenance of the information equipment such as a copying machine, a printer, a computer etc. The sales company 205 includes a service department 206 for providing services, a management system 207 for information management, and a sales company basic system 208 including the accounting system of the sale company. These departments or systems are connected by an internal network (cf. 119 in FIG. 1).

To the management system 207, information 224 relating to the user status of the information equipment such as a terminal PC, as well as the aforementioned information 225, is transmitted through the exclusive line 115 or the internet 116.

The management system 207 transmits, to the service department 206 in the sale company through the internal network (cf. 119 in FIG. 1), information 231 instructing the service providing such as photosensitive drum replacement in the printer or repair of malfunction. Also information 230, indicating such instruction for service providing or an instruction for the delivery of consumables for the copying machine or the printer, is transmitted through the internal network to the sales company basic system 208.

The sales company basic system 208 totals the amounts of consumables delivered or services provided within a predetermined period, and transmits information 229, indicting the charge billed therefor, to the basic system 202 of the user company 201 through the exclusive line 115 or the internet 116.

A bank 204 transfers the billed amount from an account to the sales company 205 in response to an instruction for the charge transfer from the basis system 202 of the user company 201 through the internet, and informs the sales company basic system of such transfer through the internet.

On the other hand, the service department 206 transmits, to a service store 210 which handles the copying machine, the printer etc., information 235 instructing the service providing by a service person, through a network such as the internet. Also the sale company basic system 208 transmits, to the service store 210, information 240 instructing delivery of a consumable, through a network such as the internet. In response, the service store 210 delivers a consumable 237 or provides a service 239 by a service person, to the user company 200.

For a failure in the information equipment such as the terminal PC, information 234 instructing the service provision by a service person is transmitted to a service store 211 which handles the PC, for example through the internet. In response, the service store 211 provides a service 238 by a service person to the user company 200.

In response to the service provided by the service store 210 or 211, the user company registers the reception of such service in the basic system 202 and issues a receipt 236 for such service to the service store 210 or 211.

Upon confirmation of the provision of the service by the service store 210 or 211, the sales company basic system 208 pays a service charge 233 to the service store 210 or 211.

A development company 209, developing and manufacturing the copying machine, printer etc. to be handled by the sales company, exchanges information 232 through a network such as the internet, for example receiving equipment information 226 for the later development or providing information for repairing failure.

Figure 3:
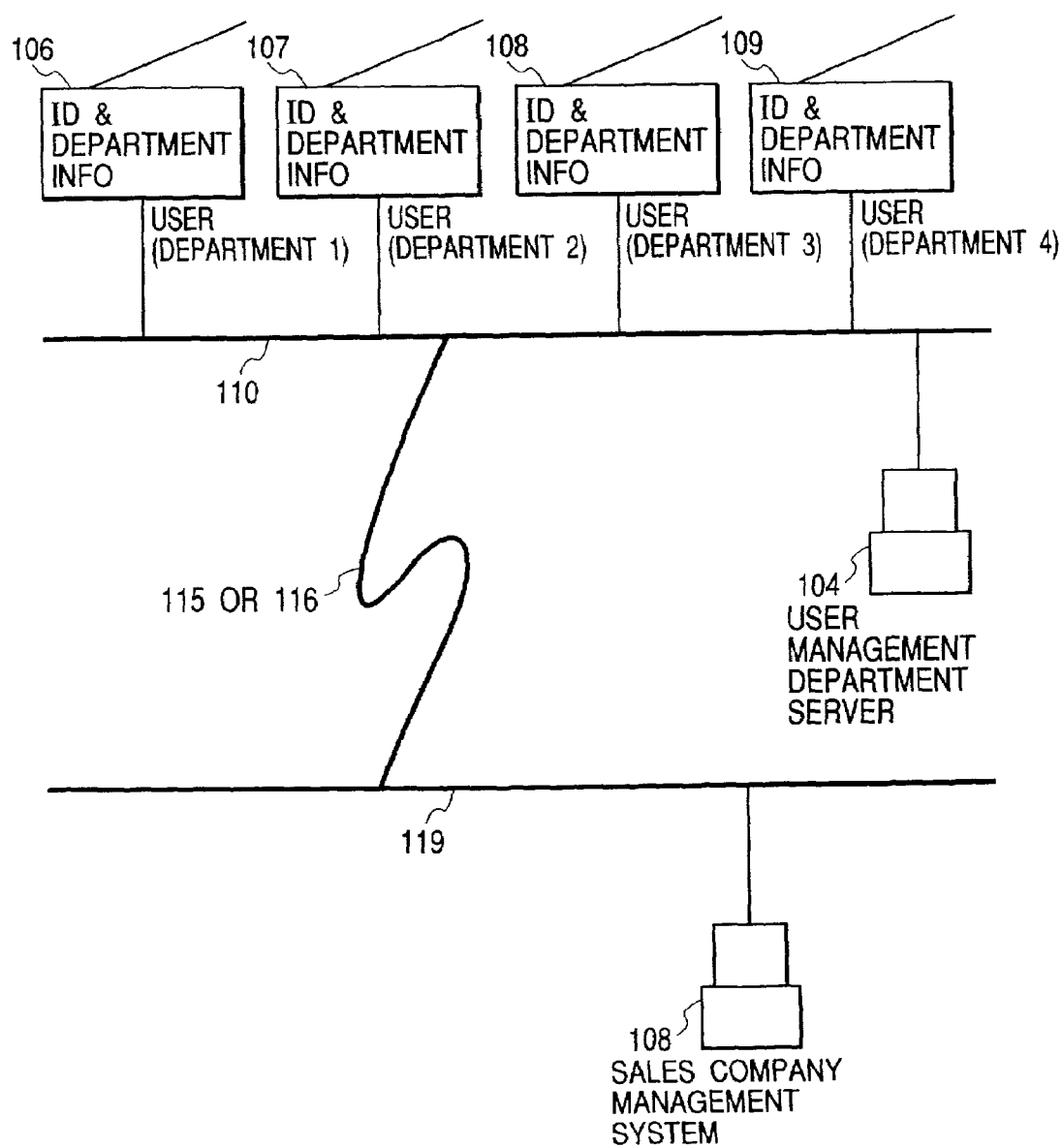
FIG. 3 is a simplified view of a part of the system configuration shown in FIG. 1.

FIG. 3 is a simplified view of a part of the system configuration shown in FIG. 1. Each of equipment 106 to 109 holds, in a memory, information necessary of remote management such as an in-company ID number indicating the main body of the equipment, information indicting the user department, information indicating the in-company management department (management department server), information indicating the service company etc. The aforementioned ID's serve as the ID's specific to the user. In the present invention, it is also assumed that the user ID serves as a personal ID.

Figure 28:
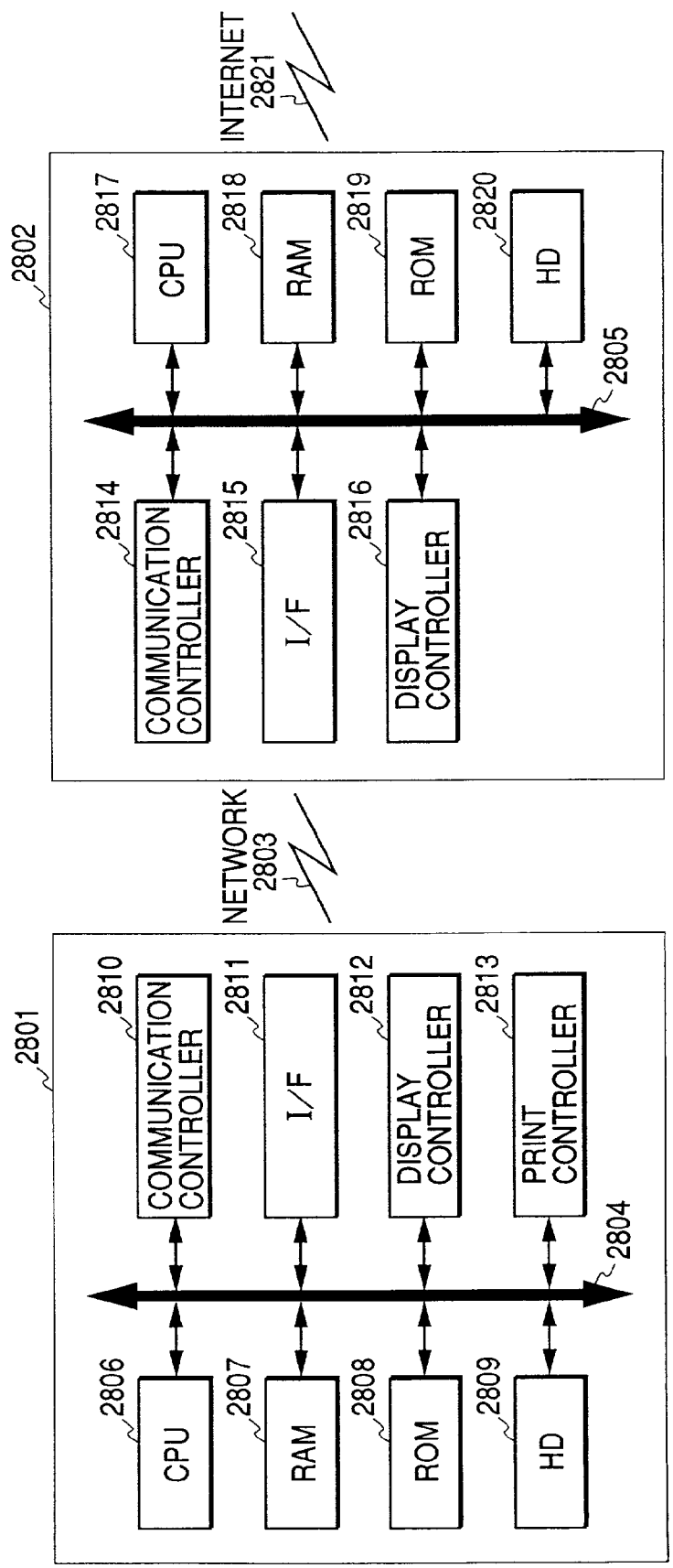
FIG. 28 is a block diagram showing an example of the image forming apparatus and the information processing apparatus.

FIG. 28 is a representative block diagram of an image forming apparatus and a computer, wherein 2801 constitutes an example of the configuration of an image forming apparatus such as 105 to 109 in FIG. 1, and 2802 constitutes an example of the configuration of the management server 104. It is assumed that the PC 103 in FIG. 1, the management server 203 in FIG. 3, the basis system 203, the management system 207, the sales company basic system 208, or a computer installed in the service store 210, 211 has a configuration similar to that of 2802.

A central processing unit (CPU or MPU) 2806 executes generation of various data and various calculations, based on programs and data stored in a RAM 2807, a ROM 2808, and an HD (hard disk) 2809.

Communication control means 2801 controls the transmission and reception of data with the various information equipment installed on the LAN, through an I/F 2811.

Display control means 2812 executes display control of a display device through the I/F 2811, and causes the display of display data stored in the RAM 2807 etc.

Print control means 2813 controls the printing of print data stored in the RAM 2806.

A data bus 2804 is used for bidirectional data communication among the blocks in the image forming apparatus 2801.

A network communication channel 2803 constitutes a communication medium for executing wired or wireless communication with the computer 2802 and various devices (not shown) connected to network communication channel.

Components 2805, 2814 to 2820 are equivalent in function to those 2804, 2806 to 2813 and will not explained further.

An internet communication channel 2821 may be constituted by an ordinary telephone channel or a wireless channel. Through such internet communication channel 2821, a user management apparatus shown in FIG. 15 (management server 203 in FIG. 2) and a center server (management system 207 in FIG. 2) are connected to execute data exchange.

The procedures of the various equipment explained in the foregoing, those to be explained in the following and the steps in the following flow charts are assumed to be executed in the configuration shown in FIG. 28.

(Process flow at equipment installation)

Figure 4:
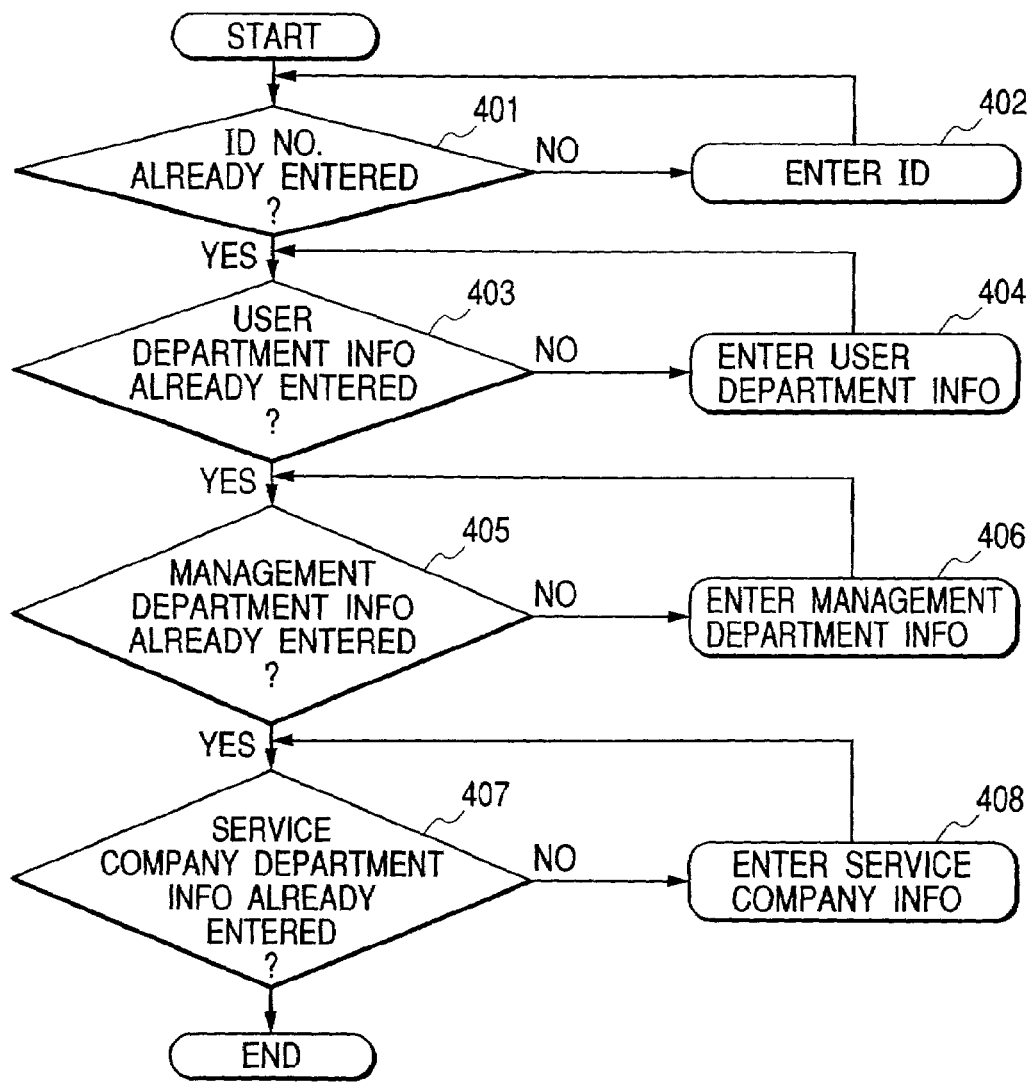
FIG. 4 is a flow chart showing the sequence of entering information held by each equipment at the installation thereof in a user department.
Figure 5:
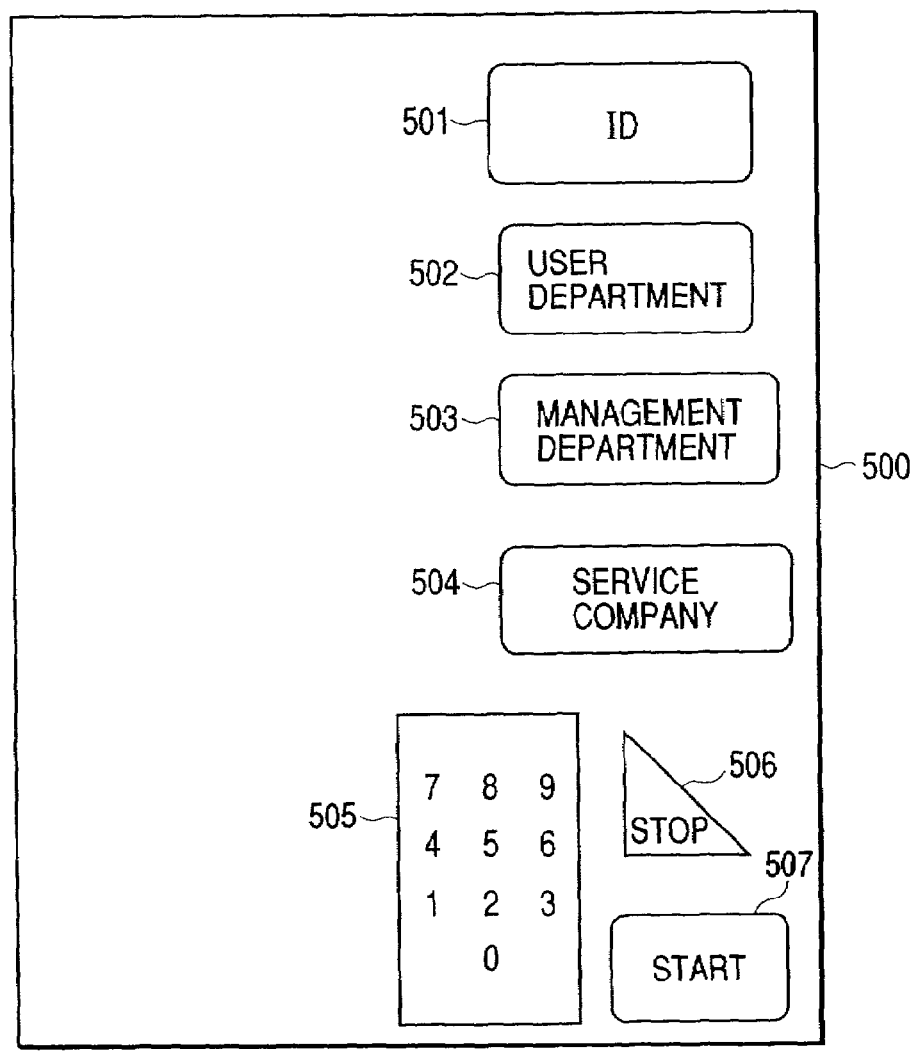
FIG. 5 is a view showing the display state of an operation unit of each equipment at the entry of information held by each information equipment.

FIG. 4 is a flow chart showing the procedure of entering the information of each information equipment at the installation thereof in the user department, and FIG. 5 is a view showing the display state of the operation unit of each equipment at the entry of the above-mentioned information. The information equipment in FIG. 4 corresponds to those such as the copying machine and printer (106 to 109) shown in FIG. 1.

In FIG. 5, there is shown a liquid crystal touch panel display 500 provided on the information equipment, on which the information can be manually entered by depressing keys 501 to 507. If the information corresponding to the keys 501 to 504 is already entered, the display of the keys 501 to 504 is inverted from positive to negative pattern to indicate that such information is already entered.

In the following there will be explained the process flow at the installation of the equipment in an equipment service mode. At first there is discriminated whether an ID number of the equipment in the user company and that in the sales company are already entered (401), and, if not, such ID number is entered by the depression of the key 501 in FIG. 5 by the operator (for example an installing person of the service company or the sales company) (402).

Then there is discriminated whether the information of the user department is already entered (403), and, if not, the information of the user department (name, code, network address etc. of organization in the user company) is entered by the depression of the key 502 in FIG. 5 by the operator (404).

Then there is discriminated whether the information of the in-company management department is already entered (405), and, if not, the information of the in-company management department (name, code, network address etc. of organization in the user company) is entered by the depression of the key 503 in FIG. 5 by the operator (406).

Then there is discriminated whether the information of the service company is already entered (407), and, if not, the information of the service company (name, code, network address etc. of the service company) is entered by the depression of the key 504 in FIG. 5 by the operator (408).

In FIG. 5 there are also shown numeral keys 505, a stop key 506 and a start key 507 which are used, together with unrepresented alphabetic keys, for the information entry explained above.

(Information management in the user management department)

Figure 6:
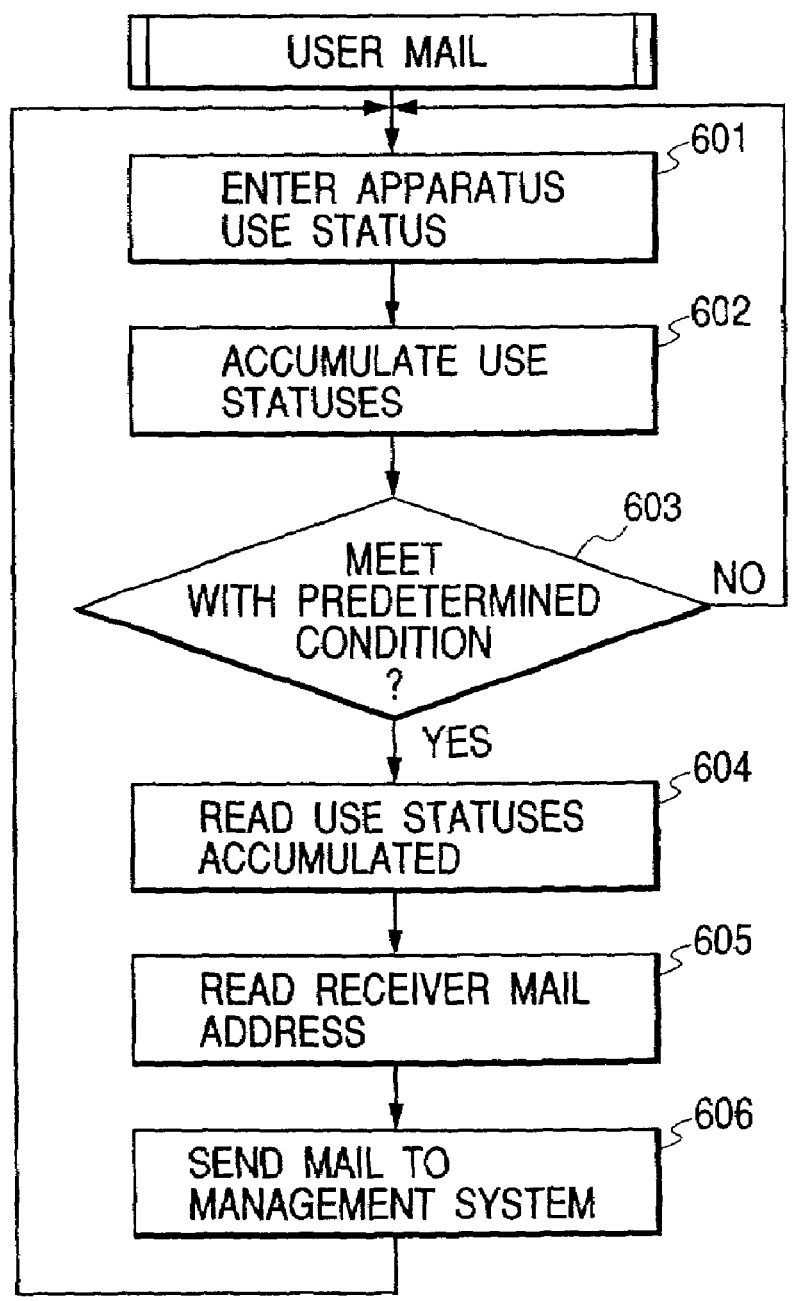
FIG. 6 is a flow chart showing an example of information management by a management server 203 in a user management department of a user company.

FIG. 6 is a flow chart showing a form of the information management by the management server 203 of the user management department of the user company.

From the information equipment such as the copying machines and printers (106 to 109 etc.) managed by the management server 203, the use status of each equipment is automatically entered therefrom through the network 110 at a predetermined interval or for each printing or copying job. Also for a paper jamming or a failure, the information indicating the kind of such failure and the time of occurrence thereof is automatically entered together with the ID stored in the memory of the equipment, through the network 110 (601). The ID stored in the equipment itself can be, in addition to the ID explained in FIG. 3, a serial number specific to the equipment (equipment ID) or a contract ID generated when the contract is made. The use status for each equipment is accumulated in succession in the memory of the management server 203 (602), and the procedure of entry and accumulation is repeated (603).

On the other hand, the management server 203 analyzes the use status for each equipment, and discriminates whether the status corresponds to a situation where the information is required for the execution of service by the sales company such as (1) a failure of the equipment requiring a restoration by the service person, (2) a case corresponding to the periodical maintenance (in case of a contract for periodical maintenance once every month, a suitable timing within several days prior to the monthly timing) or (3) a case the operator 102 of the management department judges necessary (603), and, if such condition is met, the use status accumulated in the memory is read (604), then the mail address of the management system 207 of the sales company 205 constituting the destination of the information (605) and the necessary information is transmitted as a mail to the management system 207 of the sale company 205 (606).

Figure 7:
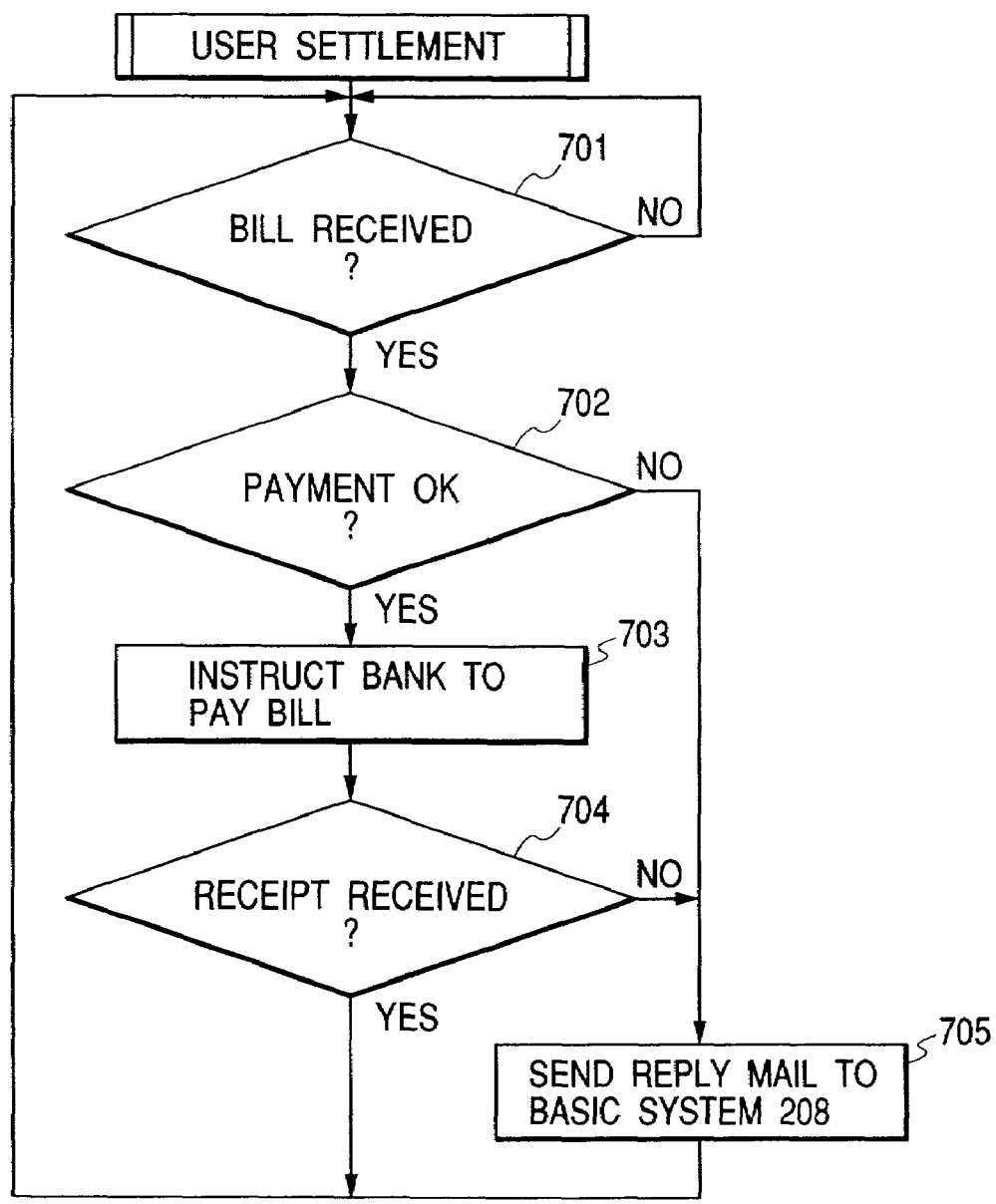
FIG. 7 is a flow chart showing the sequence of settlement by a basic system of the user company.

FIG. 7 is a flow chart showing the procedure of settlement by the basic system of the user company.

At first there is discriminated whether a bill 229 is received from the basic system 208 of the sales company (701), and, if received, there is discriminated whether the payment should be made (702). A basic condition for such discrimination is that the requested service has been actually executed, and the information therefor is entered into the basic system 202 through the network.

If the payment should not be executed, for example if the execution of the actual service cannot be confirmed, a mail including a corresponding comment is transmitted to the basic system 208 of the sales company (705). If the payment should be executed, the payment of the billed amount is instructed to the bank 204 (703). After the instruction for payment, there is discriminated whether a receipt is received within a predetermined period from the basic system 208 of the sales company (704), and, if not received, a mail with a comment similar to the foregoing is transmitted to the basic system 208 of the sales company (705).

(Information management by the management department of the sales company)

Figure 8:
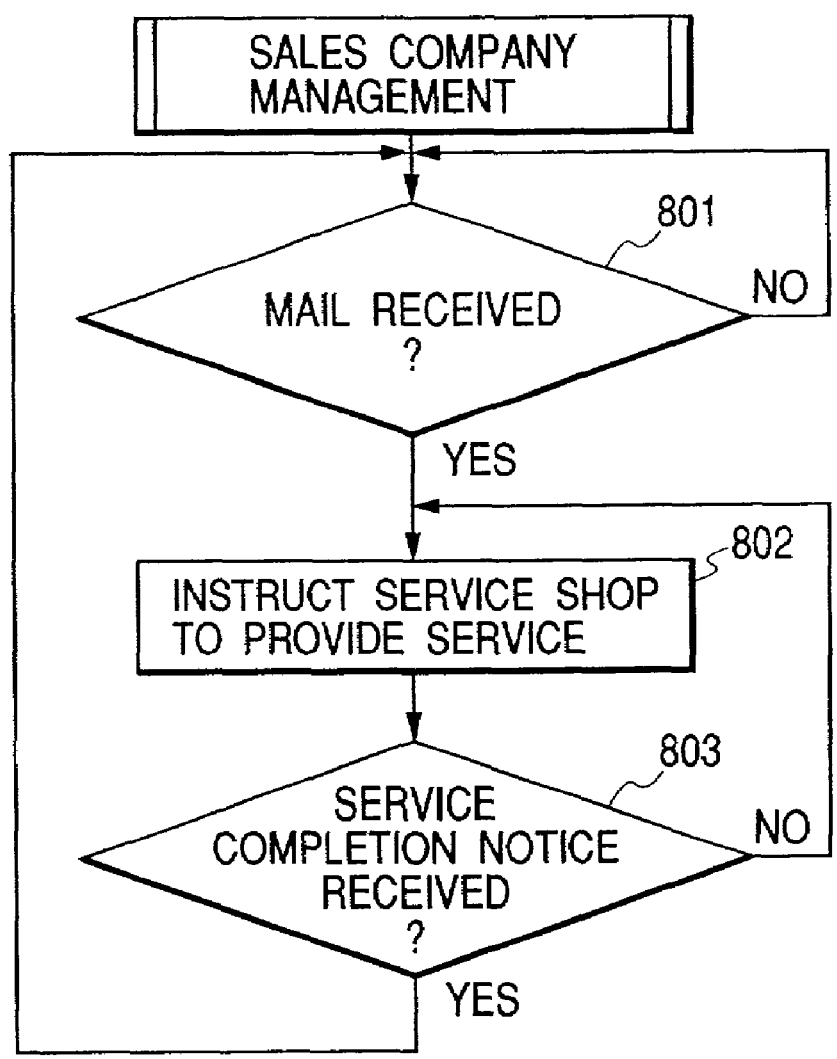
FIG. 8 is a flow chart showing an example of information management by a management department of the user company.

FIG. 8 is a flow chart showing a form of the information management by the management department of the sales company.

The management system 207 of the sales company discriminates whether the above-mentioned mail has been received from the management server 203 of the user company (801), and, if received, analyzes the content of such mail and, according to the content, instructs the providing of the service by the service store 210, 211 through the service department (802) or instructs the delivery of a consumable (paper, toner etc.) to the basic system of the sales company (802). Such instruction is made electronically through the network, and is repeated (reminded) periodically until the execution of the service is electronically confirmed by the reception of a notice for the completion of service by the service department (803).

Figure 9:
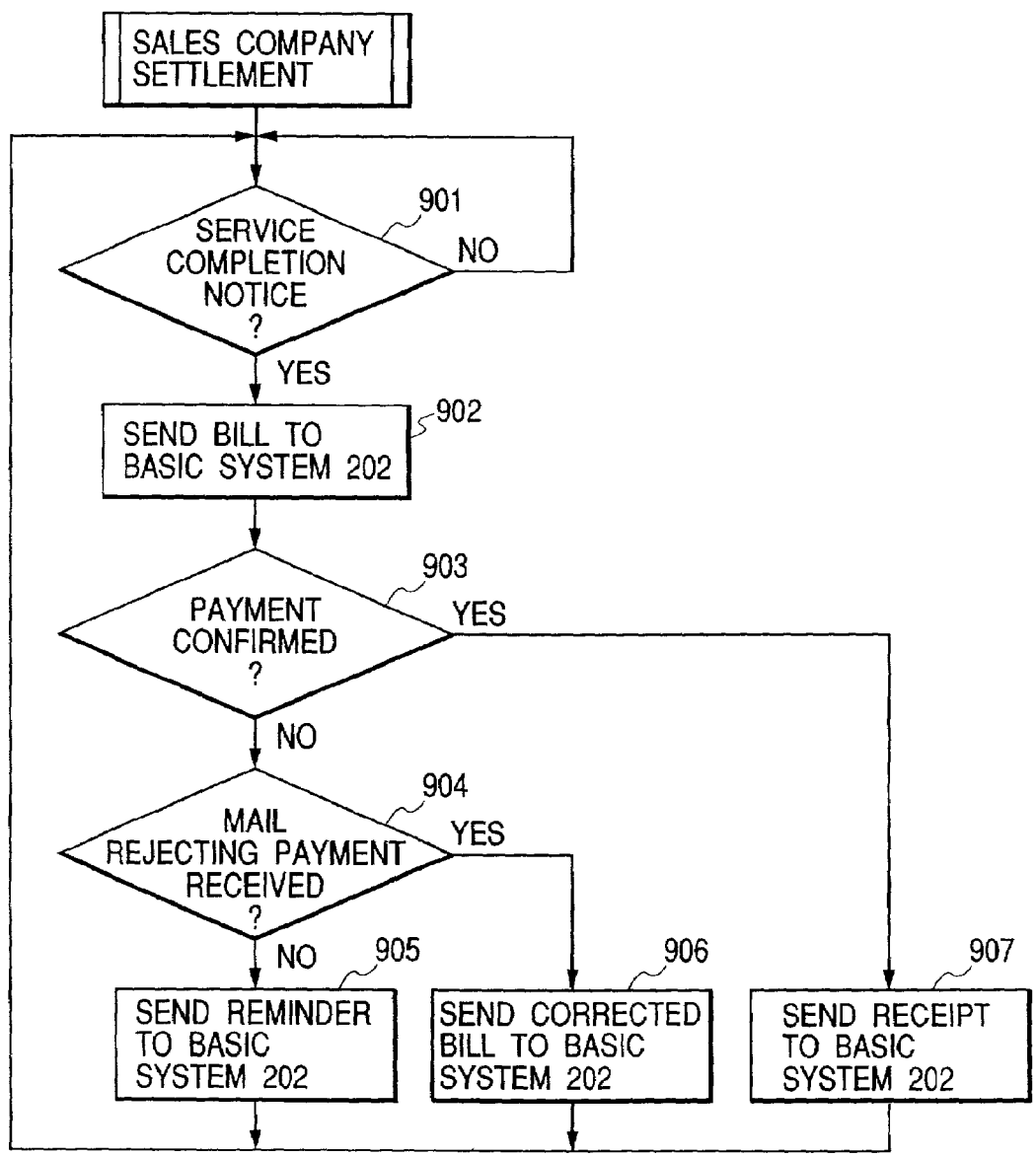
FIG. 9 is a flow chart showing the sequence of settlement by a basic system of a sale company.

FIG. 9 is a flow chart showing the procedure of settlement by the basic system of the sales company.

At first there is confirmed the transfer of a service completion notice by the step 803 in FIG. 8 from the management system 207 to the basic system 208 (901), and the bill 229 is transmitted to the basic system 202 of the user company (902). Then, if the payment can be confirmed by the aforementioned information from the bank 204 (903), a receipt is transmitted to the basic system 202 of the user company (907). On the other hand, if the payment cannot be confirmed, there is discriminated whether a mail with a comment that the payment cannot be made for example because of a failure in the bill has been received (904), and, if received, a corrected bill is transmitted again to the basic system 202 of the user company (906). If such mail has not been received, a reminder requesting the payment is transmitted to the basic system 202 of the user company (905).

Figure 11:
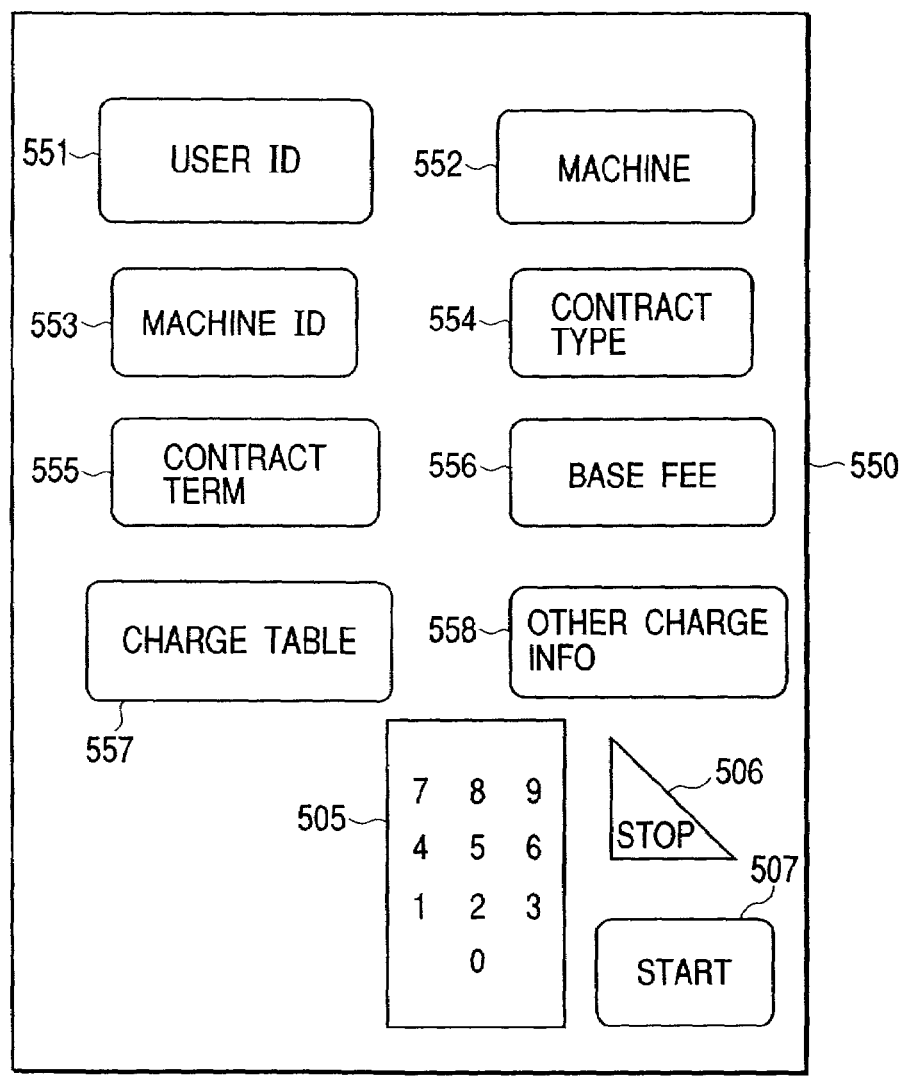
FIG. 11 is a view showing an example of input process of the management information in a management system of the sale company.
Figure 12:
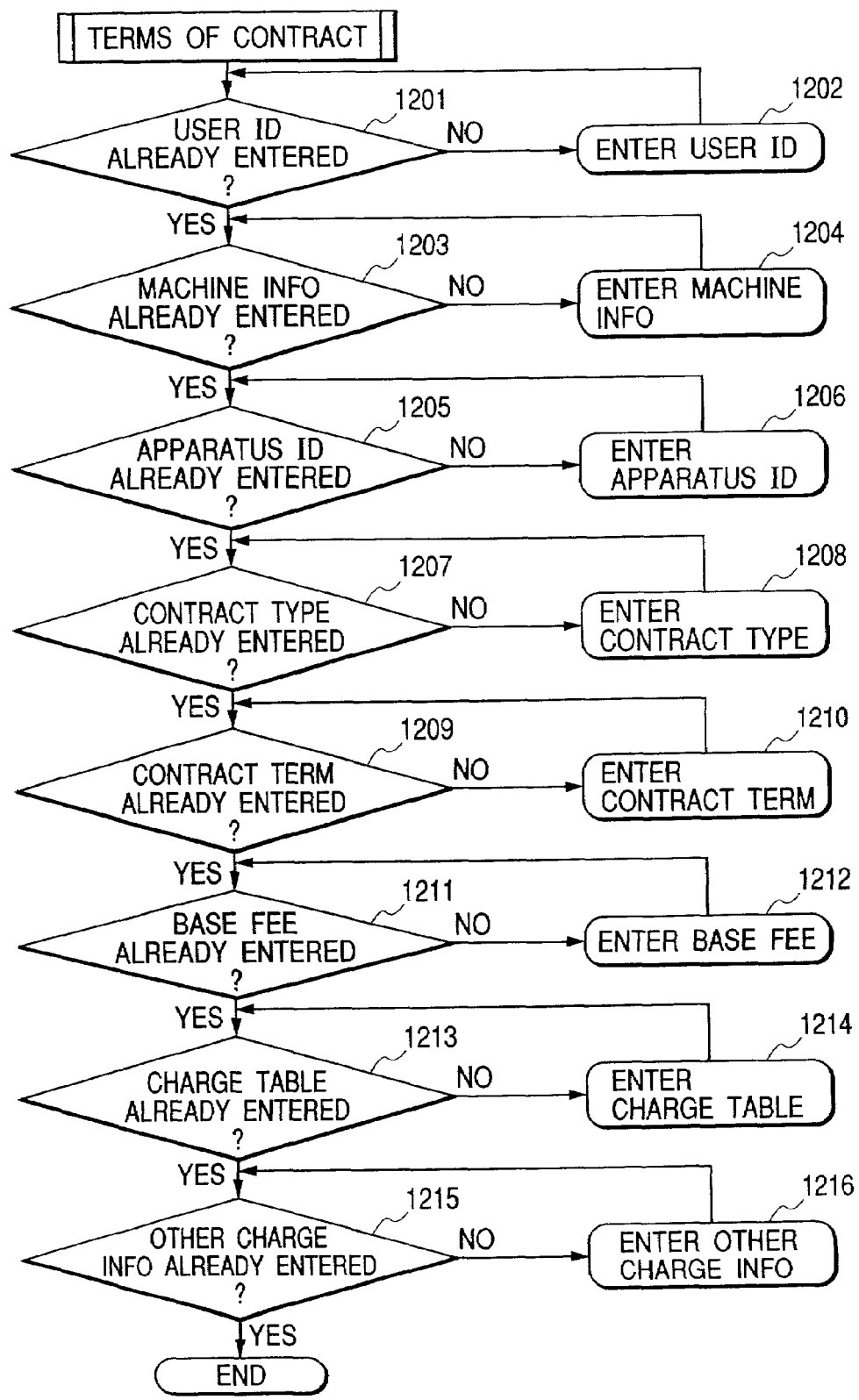
FIG. 12 is a view showing an example of input process of the management information in a management system of the sale company.

FIGS. 11 and 12 show a form of the input operation of the management information in the management system of the sales company.

In case the user company introduces a new information equipment by a new contract with the sales company, the conditions of the contract is entered in the management system 207 after the contract is concluded. At such entry, among the input items, those already entered from the information equipment into the management system 207 through the management server 203 of the user company are merely confirmed.

The entry or confirmation of the input items is executed by the terminal PC of the management system 207, and the display unit of such PC displays an input image 550 shown in FIG. 11. Input keys 551 to 558 in FIG. 11 enable the entry of a corresponding item by clicking with a mouse. If the corresponding item is already entered, the display of the key is inverted from positive to negative pattern, thereby enabling confirmation of the entered content. Keys 505 to 507 are provided for entering each item.

At first there is discriminated whether the user information such as the name and ID number of the user has been entered (1201), and, if not, the user information is entered by the key 551 from an operation unit (keyboard or mouse) of the terminal PC (1202).

Then there is discriminated whether the information of the machine constituting the object of the contract has been entered (1203), and, if not, such machine information is entered by the key 552 (1204).

Then there is discriminated whether the equipment ID of the object of the contract has been entered (1205), and, if not, the machine ID information of the object of the contract is entered by the key 553 (1206). The machine ID can be the manufacturing number thereof or a number attached at the sales.

Then there is discriminated whether the information on the kind of the contract has been entered (1207), and, if not, such information is entered by the key 554 (1208). The kind of the contract relates to the method of service providing after the purchase of the equipment, such as a maintenance management contract in which a maintenance charge is paid according to the number of prints as will be explained later, or a contract in which a service charge is paid for each service such as repair, adjustment or diagnosis desired by the user.

Then there is discriminated whether the information on the contract term (start and ending dates of the contract) has been entered (1209), and, if not, such information is entered by the key 555 (1210).

Then there is discriminated whether the amount of basic charge in the maintenance management contract in which the maintenance charge is paid according to the number of prints has been entered (1211), and, if not, such amount of the basic charge is entered by the key 556 (1212).

Then there is discriminated whether a charge table in the maintenance management contract in which the maintenance charge is paid according to the number of prints has been entered (1213), and, if not, the content of the charge table is entered by the key 557 (1214). The charge table is composed, as shown in FIG. 10, of numbers of copies or prints per month and a charge per copy. FIG. 10 shows that, for the machine A, the charge is $Aa per copy or print in case the number of copies or prints is within a range from 1 to La in a month. In case the number exceeds La, an amount $Ba is charged per a copy or a print in the exceeding portion, and, in case the number further exceeds Ma, an amount $Ca is charged per a copy or a print in the exceeding portion. The charge table is constructed similarly also for color printing ("print" means the printing of data from an external apparatus instead of copying) and for black copying or printing.

Similar charge tables are independently constructed also for a machine B.

Finally there is confirmed whether other information required for charging has been entered (1215), and such information is entered if necessary (1216).

(Example of charge calculation)

FIG. 13 shows an example of charge calculation in a maintenance management contract in which the maintenance charge is paid according to the number of prints.

As an example, there is considered a case where the user makes the contract with the charge table as shown in FIG. 10 and the copy volume within a month consists of A1 color copies, A2 color prints and A3 black copies/prints with the machine A and B1 color copies, B2 color prints and B3 black copies/prints with the machine B. In such case, the total maintenance charge for the machine A is:

$$La*(Aa+Da+Ga)+(Ma-La)*(Ba+Ea+Ha)+(A1-Ma)\\*Ca+A2-Ma)*Fa+(A3-Ma)*Ia,$$

and the total maintenance charge for the machine B is:

$$Lb*(Ab+Db+Gb)+(Mb-Lb)*(Bb+Eb+Hb)+(B1-Mb)\\*Cb+(B2-Mb)*Fb+(B3-Mb)*Ib.$$

Therefore, in case of the maintenance management contract for these two machines, the charge for the maintenance service within a month is the sum of these charges.

These calculations are executed by the management system 207 of the sales company, and the result 230 is transferred to the basic system.

FIG. 14 shows an example of the calculation of the total billed amount per month for the user company having the system shown in FIG. 1.

It is now assumed that the machines A, B covered by a maintenance management contract with the maintenance charge according to the number of prints have print volumes same as shown in FIG. 3 and that machines C, D which are printers without the scanner have the print volumes as shown in FIG. 14. In such case, the total billed amount is the total sum of (1) a charge for the monthly maintenance service (for the machines A, B (cf. FIG. 13)), (2) a monthly supply amount of toner (summed for each kind of toner and multiplied by respective unit price, for all the machines), (3) a monthly supply amount of paper (summed for each kind of paper and multiplied by respective unit price, for all the machines), (4) a monthly number of drum replacements (summed for each kind of drum and multiplied by respective unit price for the machines C and D, as the drum replacement for the machines A, B is included in the maintenance service charge), (5) a monthly parts charge (summed for each kind of part and multiplied by respective unit price for the machines C and D, as the parts for the machines A, B are included in the maintenance service charge), and (6) a monthly repair/inspection/adjustment charge (summed for the machines C and D, as such charge for the machines A, B is included in the maintenance service charge).

Such billed amount is calculated by the management system 207 and is transferred to the basic system 208, which in response issues a bill to the basic system of the user company.

(Security of information)

In consideration of the security of the information, the communication among the user company 200, the sales company 205 and the service stores 210, 211 is executed under appropriate encryption. In particular, the information of the print number communicated between the management server 203 and the management system 207 and the charge information communicated among the basic system 202, the sales company basic system 208 and the band 204 are subjected to the encryption of a higher level from the standpoint of crime prevention.

(Assurance for service execution)

In the user company 200, there is executed the following confirming operation in order to confirm the execution of the service.

At first, after the mail transmission in the step 606 in FIG. 6, the management server 203 issues, to the user department 201 of each information equipment, a service ID number for identifying the service expected for the sales company 205 (for example a periodical service in a maintenance contract for which the maintenance charge is paid according to the number of prints or a part replacement in case the maintenance contract is not concluded). The service ID numbers are issued independently for example respectively for the users (departments 1 to 4) shown in FIG. 3.

The management server 203, after receiving the mails from the user departments and after confirming the completion of services for all the service ID numbers, transmits a mail indicating that the bill from the sales company is payable, to the basic system 202.

On the other hand, if the completion of service is not confirmed for any of the service ID numbers, the management server 203 transmits a mail indicating that the bill from the sales company is not payable to the basic system 202, and also transmits a mail reminding the uncompleted service to the management system 207.

On the other hand, the sales company, after instructing services corresponding to the service ID numbers to the service stores 210, 211 and confirming the mails indicating the completion of such services, issues a mail that the bill can be issued to the basic system 208.

As explained in the foregoing, the service execution can be securely and efficiently managed, in the network environment, by managing the execution of each service by the common service ID number.

Second embodiment

In the second embodiment, there will be given a more detailed explanation on the contract process executed on the system explained in the first embodiment.

Figure 15:
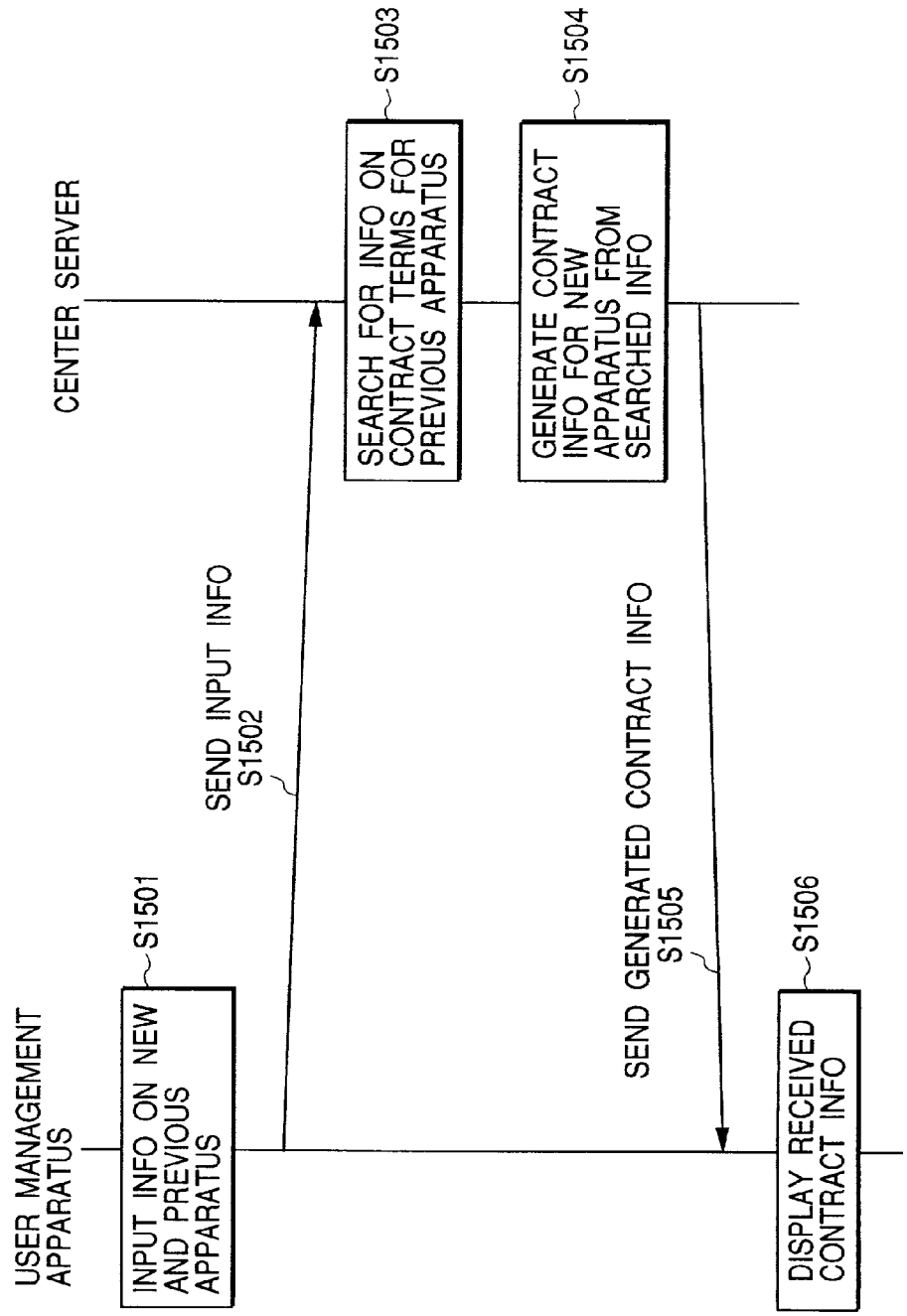
FIG. 15 is a flow chart showing an example of information exchange on a contract between a user managed equipment and a center server.

FIG. 15 is a flow chart showing the process in case the user concludes a contract at the purchase of a new image forming apparatus or at the replacement of a currently used image forming apparatus with a new one, the process to be executed by the user management apparatus and the center server.

The user management apparatus corresponds to the management server 203 in FIG. 2, a personal computer or the like connected to the management server 203 (for example a computer installed in the basic system 203), or a portable terminal with wireless communicating function. Also the center server corresponds to the management system 207 in FIG. 2 or a computer installed in the sales company basic system 208.

The user management apparatus and the center server are respectively provided with functions as explained in FIG. 28, and the processes (transmission, reception, display, storage, search and generation of data and various calculations) to be explained in the following flow charts and drawings are realized by the functions of the blocks shown in FIG. 28. The steps of the flow chart shown in FIG. 15 are realized by the CPU 2817 which executes program codes stored in the RAM 2818, ROM 2819 or HD 2820 of the user management apparatus or the center server.

The contract in the present invention means the contract term and the inclusion of the maintenance charge for example for the repair of the image forming apparatus in the charge per print output. The maintenance may include, in addition to the repair, replacement of parts, charge-free replacement of consumables, recovery of the used consumables etc. and remote maintenance such as automatic delivery of a software of a new version.

A step S1501 enters information for specifying the image forming apparatus constituting the object of a new contract (for example a newly purchased image forming apparatus) and information for specifying the image forming apparatus having a prior history of use or a prior contract. The entered information is once stored in the RAM 2818 shown in FIG. 28. The information specifying the information processing apparatus under a prior contract may include an image forming apparatus for which the contract is already terminated or an image forming apparatus under current use. The transmission of the information specifying the image forming apparatus under current use in the step S1501 may occur, for example, in case the content of the contract for the currently used image forming apparatus is to be reflected on the content of the contract for the newly purchased image forming apparatus.

Also the information specifying the image forming apparatus may include an equipment ID, a user ID (in-company ID number of the equipment explained in FIG. 3, information indicating the user department or the in-company management department (management department server)), or a contract ID, and the equipment ID may be stored in a memory of the equipment at the shipment thereof from the manufacturing factory while the user ID or the contract ID may be generated by the center server and informed to the user or may be entered from the operation unit of the equipment (FIG. 5). In the present invention, the informing means transmission of the information to be informed.

A step S1502 transmits the information entered in the step S1501 and stored in the RAM 2818 by the communication control means 2814 from the user management apparatus to the center server through the internet 2821 (corresponding to the exclusive line 115 or the internet 116 in FIG. 1).

A step S1503 executes reception of the information transmitted in the step S1502, and information of the result of contract or the history of use is searched, based on the received information, from a data base stored in a memory unit of the center server.

A step S1504 automatically generates contract information for the equipment constituting the object of a new contract (for example an equipment newly purchased by the user or planned to be purchased by the user) based on the information such as "use history", "content of contract", "presence or absence of prior contract" searched in the step S1503. The generated contract information is stored in and managed by the memory means of the center server. Also the information on the history, contract content, prior contract etc. means information on the image forming apparatus that was or is covered by a contract between the user and the sales company.

A step S1505 transmits the contract information, generated by the center serve in the step S1504, from the center server to the user management apparatus, and a step S1506 displays the information, transmitted to the user management apparatus in the step S1505, on the display unit, such as a CRT, of the user management apparatus. Observing such information, the user can know and consider the details of the new contract.

In consideration of the security, the communication of information in the steps S1502 and S1505 is executed under encryption.

The process explained in FIG. 15 may also be executed between the image forming apparatus and the center server, by providing the image forming apparatus with functions similar to those of the user management apparatus. More specifically, the process shown in FIG. 15 may be realized by providing the image forming apparatus with the communication control means, the display control means, the HD etc. as shown in FIG. 28.

In the following, there will be explained components 1601 to 1604 in FIG. 16, in which components 1605 to 1609 will be explained later.

Figure 16:
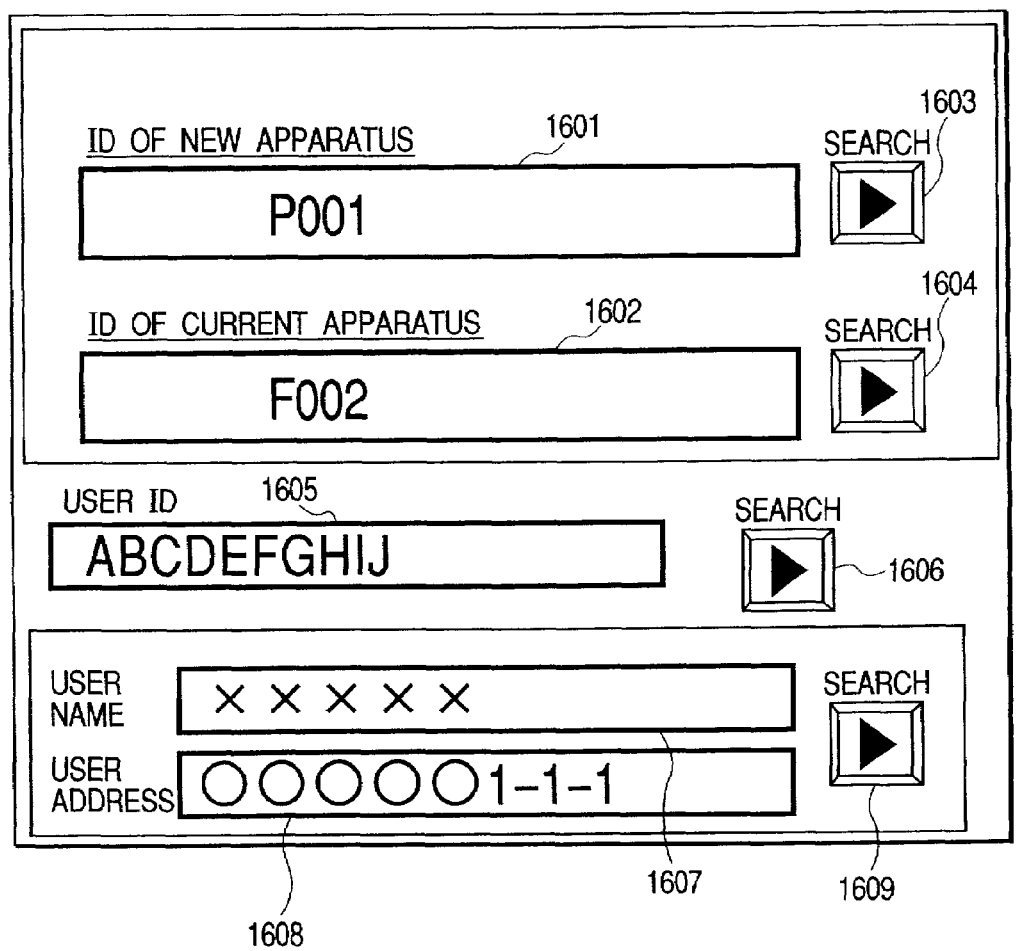
FIG. 16 is a view showing an example of the user interface to be used for contract renewal.

FIG. 16 shows an example of display of the information transmitted from the center server in the step S1502, namely a user interface image to be displayed on the display unit of the user management apparatus or the image forming apparatus at the entry of information.

An input column 1601 is used for entering an ID specifying the equipment which is newly purchased or is to be newly purchased. The ID to be entered in the column 1601 is not limited to that of the newly purchased equipment but also includes, in the present invention, the ID of an equipment constituting the object of the object of a new contract. Also if the ID is not known, there may be considered a case of entering a message such as "new purchase planned" or a case of not executing entry. In such case, the operator of the center server, receiving such information, may specify the ID of the new machine through an electronic mail or telephone process.

An input column 1602 is used for entering an ID specifying the image forming apparatus used before, namely the ID specifying the equipment to be replaced. In case of a replacement, there may be entered the ID of the currently used image forming apparatus, and, in case the user purchases a new equipment with an interval after a prior contract, there may be entered the ID specifying the image forming apparatus used before.

In the present invention, the ID's entered in the columns 1601, 1602 for specifying the image forming apparatus may be the equipment ID (serial number given to the equipment at the shipment from the factory), the contract ID (contract number managed by the service company) or the machine ID (indicating the machine type).

Figure 21:
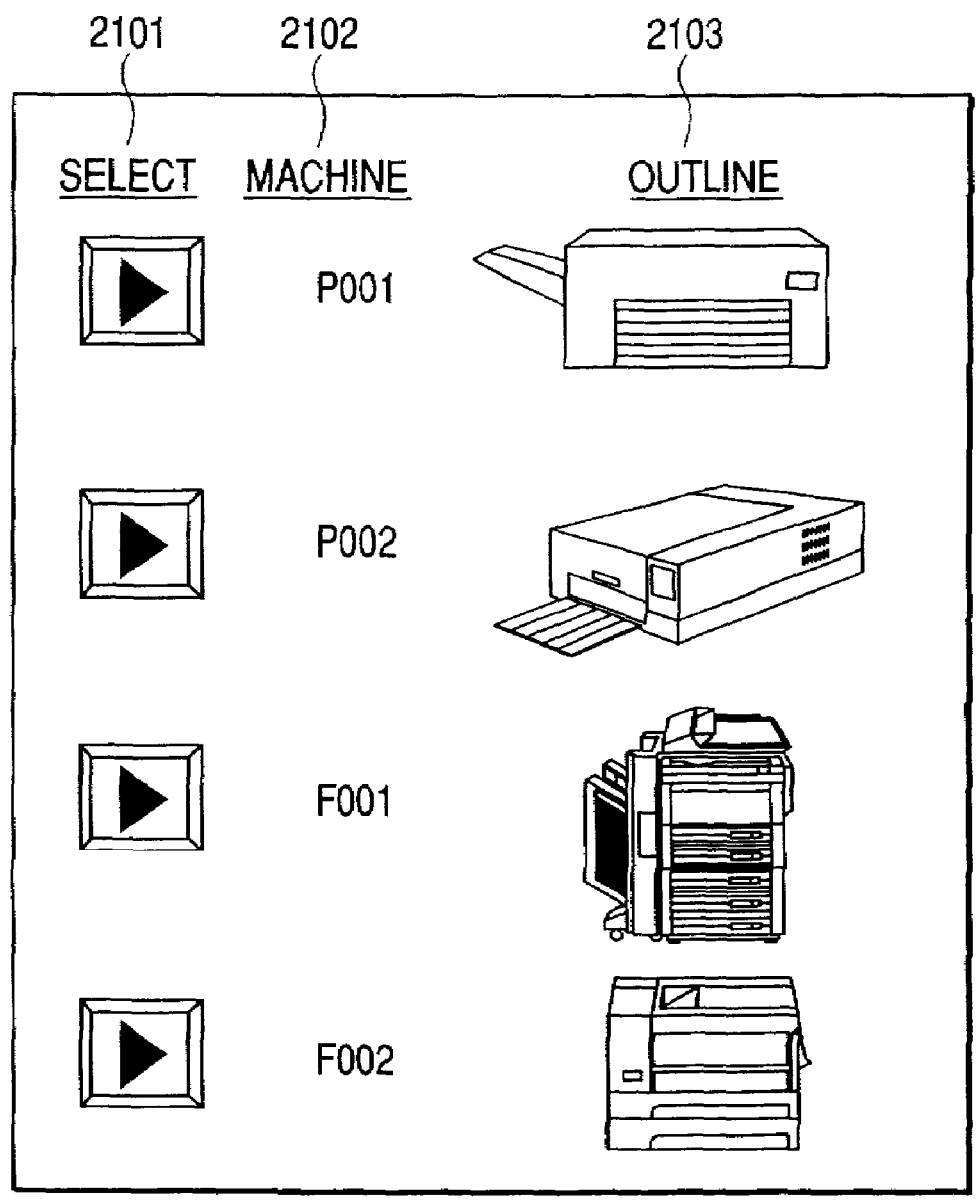
FIG. 21 is a view showing an example of the user interface for searching ID information.

Buttons 1603, 1604 are used for instructing the search of the new purchase ID and the old machine ID. In case such buttons are actuated by a pointing device such as a keyboard, a mouse or a liquid crystal touch panel, the information of a display image as shown in FIG. 21 is transmitted from the center server to the user management apparatus and is displayed on the CRT of the user management apparatus or the display unit of the image forming apparatus. By referring to such displayed image, the user can specify the ID corresponding to the machine used before by the user or constituting the object of the new contract. Also a more efficient ID entry system may be provided if the ID selected in FIG. 21 can be automatically entered in the column 1601 or 1602 in FIG. 16.

In the following there will be explained, with reference to FIGS. 17 and 18, the details of the process of the center server in the steps S1503, S1504 in FIG. 15.

Figure 17:
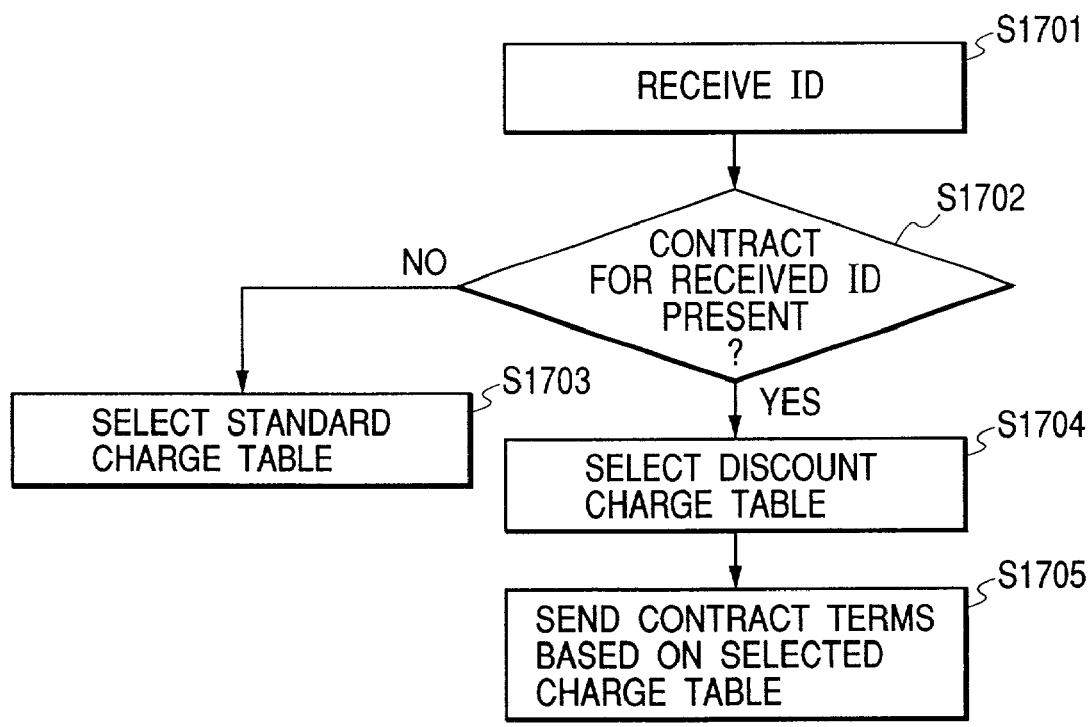
FIGS. 17 and 18 are flow charts showing examples of generation of contract information in the center server.

FIG. 17 is a flow chart showing a process, in determining the content of the contract for the newly purchased image forming apparatus, of differentiating the content of the contract depending on the presence or absence of the prior contract.

A step S1701 receives the ID transmitted from the user. In the present invention, such ID may be the equipment ID (serial number given to the equipment at the shipment from the factory), the contract ID (contract number managed by the service company) or the machine ID (indicating the machine type).

A step S1702 searches whether the prior contract history is present, based on the ID received in the step S1701. This means that the memory means (data base) of the center server stores/manages the contract history for each ID. Such contract history includes the past contract and the currently effective contract.

In case the step S1702 identifies absence of the prior contract history for the received ID (No in S1702), a step S1703 determines the use of an ordinary charge table.

In case the prior contract history is present (Yes in S1702), a step S1704 determines the use of a discount charge table, which will be explained later in more details.

FIGS. 19 and 20 show examples of the charge table determined in the step S1703, S1704. These charge tables may be stored in advance in the memory means (data base) of the center server, but the objects of the present invention may also be attained in a case where the figures of the table are calculated and generated for each time by the center server. The ordinary charge table may be that for the machine A as shown in FIG. 10. FIGS. 19 and 20 respectively show the charge tables determined in the step S1703 and in the step S1704. Thus, in case the step S1702 judges the presence of the prior contract history, there is adopted the discounted charge table shown in FIG. 20, and, in case of absence of the prior contract history, there is adopted the charge table without the discount information as shown in FIG. 19. The discount means that the charge per print output in FIG. 20 is relatively lower than that in FIG. 19.

The use of the charge tables as shown in FIGS. 19 and 20 allows the user to advantageously utilize the presence of the prior contract, thereby enjoying a merit such as a cheaper contract.

Figure 18:
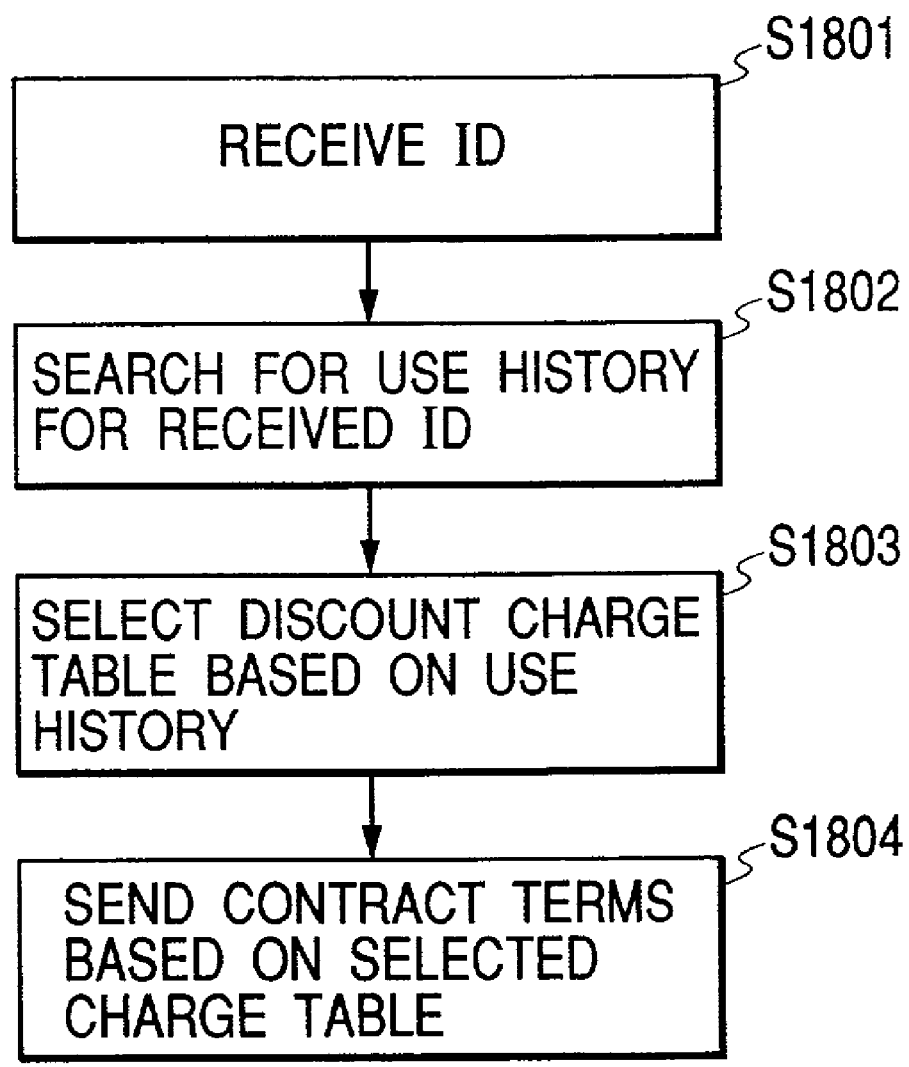

FIG. 18 shows another process which, different from that shown in FIG. 17, determines the content of the contract by referring to the past use status or use history of the user or the image forming apparatus.

A step S1801 is similar to the step S1701. A step S1802 searches the use history of the apparatus specified by the ID received in the step S1801. The use history includes that of the equipment no longer used and that currently used.

A step S1803 determines a discounted charge table based on the past use history, and a step S1804 transmits the contract content based on such charge table from the center server to the user management apparatus. In this operation there is executed a process of selecting and determining an ordinary charge table as already explained in FIG. 19 in case for example the number of print outputs does not reach a predetermined number but a charge table including discount information as shown in FIG. 20 if the predetermined number is reached.

Also in the present invention, there may be conceived a process of selecting a charge table with a discount amount larger than that in the charge table shown in FIG. 20, in case the number of color print outputs exceeds a predetermined number within the number of prints. Started differently, the present invention includes setting the charge tables as shown in FIGS. 19 and 20, respectively for the black-and-white machine, color machine, high-speed machine, low-speed machine etc.

Thus, more detailed discount service can be provided to the user by utilizing the charge tables respectively for the different machines and storing the predetermined numbers of prints in the data based as explained in the first embodiment.

In the present invention, it is further conceivable to determine a charge table of a large discount amount not only depending on the predetermined numbers but also on whether the number of print outputs per unit time exceeds a predetermined number. More specifically, the discount amount in the column 2002 is made larger according to whether the number of color outputs per month is at least equal to 1000 (for example employing "N-3" for the total number of prints instead of "to 999".

In the foregoing, there has been explained an example utilizing 1 month as the unit time and the number of color outputs as the output number, but the present invention is not limited to such example and there may be adopted a period of a week or a year. Also the output number is not limited to the number of color print outputs but may be the number of black-and-white print outputs or high-speed print outputs.

As explained in the foregoing, the flow chart shown in FIG. 15 provides a system in which the user can advantageously utilize the prior contract history or use history for the image forming apparatus designated by the user.

In the following there will be explained, with reference to FIGS. 27A and 27B, a system and a process effective in case the user has a contract for plural equipment. The steps of the flow chart shown in FIGS. 27A and 27B are realized by the CPU 2817 which executes program codes stored in the RAM 2818, ROM 2819 or HD 2820 of the user management apparatus or the center server.

Figure 27A:
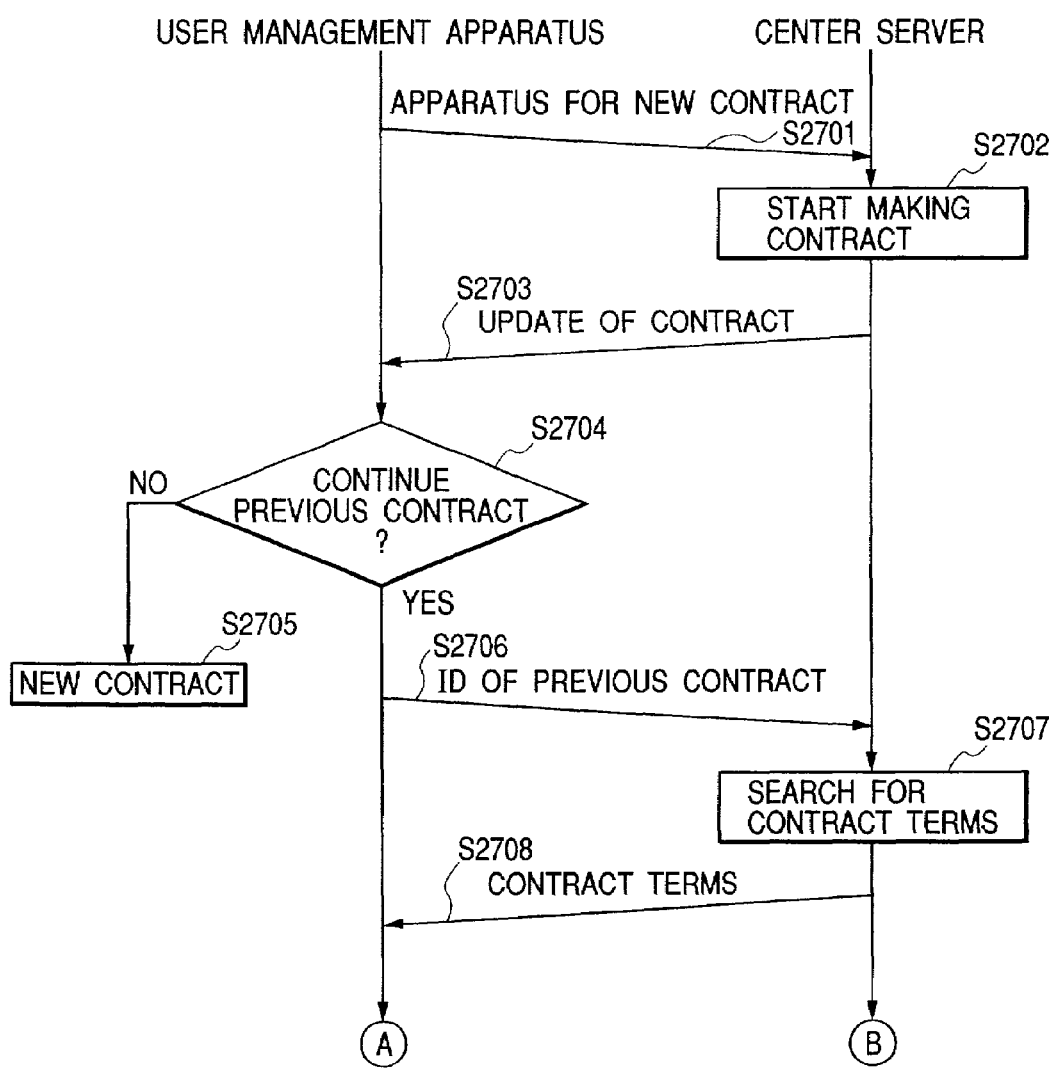
FIGS. 27A and 27B are flow charts showing an example of information exchange on a contract between the user managed equipment and the center server.
Figure 27B:
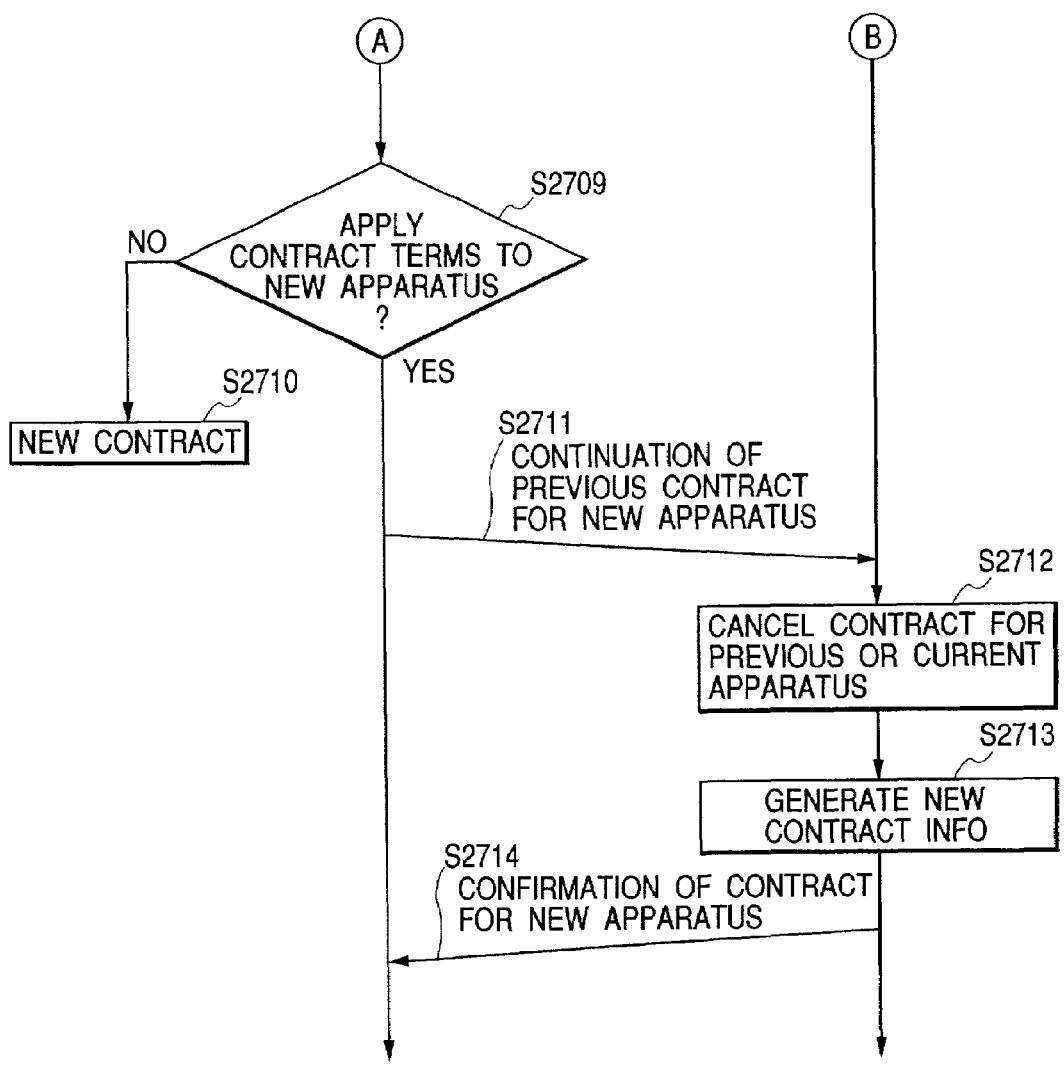

FIG. 27A shows a process of concluding a new contract in case the user purchases a new image forming apparatus or replaces the currently used image forming apparatus, wherein the user management apparatus and the center server are similar to those in FIG. 15.

A step S2701 informs, from the user management apparatus to the center server, information on the purchase of a new image forming apparatus. In the present invention, such informing may be made by an e-mail through the internet, information entered from the home page of a sales store, or information entered from the portable terminal of a service person visiting the user. For transmitting the ID for specifying the new image forming apparatus, there can be utilized, for example, the new purchase ID column 1601 shown in FIG. 16. The details of such transmission will be omitted as they are similar to those explained in the foregoing. In the present invention, the information informed in the step S2701 is not limited to the information indicating the purchased of a new machine, but may include information indicating an equipment constituting the object of a new contract.

A step S2702 starts conclusion of the contract for the new machine. A step S2703 informs, from the center server to the user management apparatus, information for a contract renewal. Such information includes message information such as "Is prior contract continued? Yes/No".

A step S2704 enters the discrimination for the message informed in the step S2703. More specifically, there is entered the information "Yes" or "No" designated by the pointing device such as the mouse, keyboard or liquid crystal touch panel on whether the prior contract is to be continued.

If information No is entered, the sequence shifts, at a step S2705, to the ordinary procedure for concluding the new contract. In such new contract concluding procedure, there is concluded a contract of the charge system utilizing the ordinary charge table as shown in FIG. 19.

On the other hand, if information Yes is entered, a step S2706 transmits information specifying the prior contract, namely the ID of the equipment of the prior contract, from the user management apparatus to the center server. Such ID is entered through the aforementioned input column 1602 shown in FIG. 16. In the present invention, the ID of the equipment of the prior contract, entered in the step S2706, may be the ID information for the equipment covered by the currently effective contract.

A step S2707 searches the contract information, based on the information transmitted in the step S2706.

A step S2708 transmits the result of search of the step S2707 to the user management apparatus. The display unit of the user management apparatus executes display of the transmitted information (not shown in the flow chart).

A step S2709 executes input of final confirmation whether or not to reflect the content of the contract transmitted in the step S2708 on the content of the contract for the equipment constituting the object of the new contract.

In case information No is entered in the step S2709, a step S2710 executes the normal process for concluding the new contract. The process of the step S2710 will not be explained further as it is similar to that of the step S2705 explained in the foregoing.

On the other hand, if information Yes is entered in the step S2709, the sequence shifts to a step S2711.

A step S2711 transmits, from the user management apparatus to the center server, information indicating that the content of the contract for the image forming apparatus having a contract history is continued in the content of the contract for the equipment constituting the object of the new contract.

A step S2712 receives the information transmitted in the step S2711, and executes a process of discontinuing the contract for the equipment used before or in current use, in order to continue the contract information of the prior or currently effective contract in the contract for the equipment constituting the object of the new contract.

A step S2713 generates new contract information reflecting the contract information searched in the step S2707.

A step S2714 transmits the contract information generated in the step S2713 to the user management apparatus, and such contract information is displayed on the display unit of the user management apparatus whereby the user can observe the displayed information.

In the following there will be explained a process of specifying the equipment to be replaced, among those used before or currently by the user. Such process may be considered to be executed when the user specifies the equipment constituting the object of the prior contact in the step S1501 in FIG. 15 or to be included in the step S2701 or S2704 in FIGS. 27A and 27B.

A column 1605 is used for entering the ID. Columns 1607, 1608 are used for entering items required for the search in case the user forgets the user ID etc., and are respectively used for entering the user name (company name at the conclusion of the contract) and the user address (address at the conclusion of the contract). When the search is instructed by the depression of a button 1609, the information of the user name and the user address is transmitted to the center server, which in response searches the user ID based on the transmitted information, and the searched user ID is transmitted from the center server to the user and is displayed. At this operation, all the contract information corresponding to the user ID is transmitted from the center server.

In the following there will be explained a process relating to a contract list display button 1606.

A contract list display button 1606 displays a history list relating to the contracts specified corresponding to the ID entered into the column 1605. When the depression of the contract list display button 1606 is recognized, a list acquisition command is transmitted from the user management apparatus to the center server, which searches a contract history list based on the transmitted user ID and transmits the searched list to the user management apparatus.

FIG. 22 shows an example of the list displayed on the display unit of the user management apparatus in response to the input in the column 1606. The list includes information on the equipment under a current contract (for example information on CP100) and information on the equipment in a past contract (for example information on BP200), and also includes discount information (2207) for each equipment.

The display image shown in FIG. 22 is utilized, for example in case of replacement, if the contract condition for the equipment used before is to be continued for the newly purchased equipment. The ID (contract ID, machine ID or equipment number ID in FIG. 22) for the equipment selected by the pointing device such as the mouse or keyboard in FIG. 22 is automatically entered into the column 1602 in FIG. 16.

Then information (ID) specifying the machine constituting the object of the new contract is entered by the user and is transmitted, together with the ID of the equipment having the contract history entered in the aforementioned column 1602, from the user management apparatus to the center server.

In this manner there is executed the process of continuing the content of the contract for the prior contracted equipment in the content of the contract for the equipment constituting the object of the new contract.

As an example, FIG. 22 shows an equipment with a contract ID P006 as the equipment of the prior contract. Also in the present invention, the ID entered in the column 1602 is not limited to that of the equipment used before but can be a contract ID PPP004.

In FIG. 22, a recommendation flag 2209 is information stored and managed in the center server and is automatically generated for the machine with the highest discount rate. The flag indicates that, for example at the purchase of a new image forming apparatus, it is most advantageous for the user if the contract for an image forming apparatus bearing such flag is continued to the contract for the new image forming apparatus. Such recommendation flag allows the user to understand the advantageous contract condition currently available to the user.

FIG. 23 shows another form of the display shown in FIG. 22, and is different from FIG. 22 in that a number of points is added to each use history of the user. Such point number is determined according to the number of print outputs of the image forming apparatus, and can be based on the information indicating the number of print outputs by each image forming apparatus in each specified period, which, as explained in the foregoing, is transmitted as the equipment information 225 and the information 226 shown in FIG. 2 from the user management apparatus to the center server through the exclusive line 115 or the internet 116. The input process of the ID information into the column 1602 shown in FIG. 16 will not be explained further as it is similar to that explained in FIG. 22.

In the following there will be explained a process, in case of replacing a black-and-white printer BP200 of a contract ID P006 with a copying machine BC300 (newly purchased image forming apparatus), of utilizing the contract result of the BP200 in the contract for the BC300.

The ID of BC300 and the ID (P006) of BP200 are respectively entered in the columns 1601, 1602 shown in FIG. 16, and the entered information is transmitted from the user management apparatus to the center server.

The center server executes a contract process based on the transmitted information and utilizing a point conversion table shown in FIG. 24, which is stored in the memory means of the center server and is utilized in the replacement between different machines at the user. In the present example, in which the BP200 is replaced by the BC300, the point number is to be doubled. As the number of points for the BP200 (P006) shown in FIG. 23 is 100 points, there is applied a point number of 200.

When the point number is calculated by the conversion table shown in FIG. 24, there is utilized a point number-to-discount amount conversion table shown in FIG. 25. In the illustrated example, the point converted from the table in FIG. 24 is 200 points, so that the discount amount is $3 per print. The conversion tables shown in FIGS. 24 and 25 are stored in advance in the memory means (data base) of the center server.

FIG. 26 shows an example of the charge table generated from FIGS. 24 and 25. If the charge table for the machine A shown in FIG. 10 is taken as the ordinary charge table, the table shown in FIG. 26 is generated by calculation and included in the contract for the newly purchased image forming apparatus BC300. The charge table including the generated discount information is transmitted, as displayable information, to the user management apparatus for display on the display unit of the image forming apparatus set as the user side.

The conversion tables as shown in FIGS. 24 and 25 allows to provide the user with a more flexible discount service. For example, in case of replacing CP100 (color printer) with BC300 (black-and-white copying machine), a larger number of the print outputs is anticipated in the latter than in the color printer. Therefore, the discount amount is determined by multiplying the point number, accumulated for the CP100, by 4. Such table allows to include the information of a larger discount amount in the contract information, for a new contract of a machine for which a larger number of the print outputs can be anticipated. The figures shown in FIGS. 24 and 25 are not restrictive but can be flexibly altered according to the situation. It is for example possible to increase the multiplication rate in FIG. 24 so as to obtain a higher number of points or to obtain a higher value of the discount amount in FIG. 25, than in the ordinary case, if the machine introduced by the replacement is recommended by the sales side.

In the present invention, it is also possible, as another embodiment different from those shown in FIGS. 24 and 25, to provide the memory means of the computer in the service center with such a point table which assigns different points for each black-and-white print output and each color print output, and adopts different discount amounts respectively for the different machines. An example of such point table is shown in the following:

| | |
|---|---|
| B/W machine A | 1.0 point per print |
| B/W machine B | 1.5 points per print |
| Color machine A | 1.5 points per print |
| Color machine B | 2.0 points per print |

The points are calculated and accumulated according to the foregoing table and the number of print outputs of the image forming apparatus. Then the discount amount is determined according to the accumulated number of points and the table shown in FIG. 25, and there is generated the contract information including the charge system for the user.

In general, the cost per printing of a color machine is higher than that of a B/W machine. The user can obtain points according to the cost per print output, different for each machine, and can utilize thus acquired points for the discount of the newly purchased machine. Also the list information as shown in FIG. 23 can be displayed on the display unit of the user management apparatus or the image forming apparatus, whereby the user can confirm the points in each image forming apparatus.

Also the ID for the equipment selected by the pointing device such as the mouse or keyboard in FIG. 23 as in FIG. 22 is entered in the column 1602 in FIG. 16, and the ID of the newly purchased image forming apparatus is entered into the column 1601 and such information is transmitted to the center server, whereupon the processes shown in FIGS. 24 and 25 are executed in the center server.

Also by transmitting the result of such execution as displayable information from the center server to the user management apparatus for enabling observation by the user, the user can easily know the specific discount amount obtainable by continuing the contract result of which image forming apparatus to white image forming apparatus.

The present invention also includes a configuration of storing and managing, in the center server, the continued contract condition (2307) and the accumulated points (2309) for the equipment for which the contract term already expired, together with effective term information. Such effective term is managed by the center server, based on the data entered for example in the step S1209 of the first embodiment shown in FIG. 12. Such effective term allows the sales side to recommend the replacement to the user.

According to the present invention, there can also be conceived a system in which the user can utilize the accumulated points obtained by summing the points for each image forming apparatus. More specifically it is conceivable to calculate, in the center server, the sum of the points shown in FIG. 23. The summed points are converted into discount information by a table correlating the points and the discount amount as shown in FIG. 25. The table determining the discount amount is not limited to that shown in FIG. 25, but the present invention may also include the use of a table storing the discount amount corresponding to the total points.

Also by attaching the effective term information to the accumulated points of each image forming apparatus, the points judged by the computer as outside the effective term can be excluded from the calculation of the total points, whereby the total points can be calculated more accurately. For example, the points corresponding to the user status of the image forming apparatus and generated many years ago can be excluded from the points used for the discount service.

As explained in the foregoing, the present invention allows the user to effectively utilize the contract result and the use history of the image forming apparatus constituting the object of the current or prior contract in the contract of the image forming apparatus to be newly purchased.

(Others)

In the foregoing embodiments, the color copying machine and the color printer have been explained as the information equipment of the user company, but there may also be included the monochromatic copying machine and monochromatic printer.

Also similar management is possible not only for the copying machine and the printer, but also for other information equipment such as a color or monochromatic facsimile, image scanner etc.

Also the printer engine is not limited to the aforementioned one of the electrophotography system utilizing toner, but the system of the present invention is likewise applicable to the engines of other systems such as the ink jet system.

Also in the foregoing embodiments, the toner charge is not included in the maintenance management contract in which the maintenance charge is paid according to the number of prints, but it is also possible to include the toner charge in such contract. Similar consideration is applicable also for the paper.

The objects of the present invention can naturally be attained also in a case where a memory medium storing the program codes of a software realizing the functions of the aforementioned embodiments is supplied to a system or an apparatus and the functions of the aforementioned embodiments are realized by a computer (CPU or MPU) of the above-mentioned system or apparatus by reading and executing the program codes stored in the memory medium.

In such case the program codes themselves of the software realize the functions of the aforementioned embodiments, and the memory medium storing the program codes constitutes the present invention. The memory medium storing such program codes can be, for example, a floppy disk, a hard disk, an optical disk, a magnetooptical disk, a CD-ROM, a CD-R, a magnetic tape, a non-volatile memory card or a ROM.

The present invention also includes not only a case where the functions of the aforementioned embodiments are realized by the execution of the program codes read by the computer but also a case where an operating system or the like functioning on the computer executes all or a part of the actual processes under the control of such program codes thereby realizing the functions of the foregoing embodiments.

The present invention further includes a case wherein the program codes read from the memory medium are once stored in a function expansion board inserted into the computer or a function expansion unit connected to the computer, and a CPU provided in the function expansion board or the function expansion unit executes all the process or a part thereof under the control of such program codes, thereby realizing the functions of the aforementioned embodiments.

In case of applying the present invention to the above-mentioned memory medium, such memory medium stores the program codes corresponding to the flow charts explained in the foregoing.

As explained in the foregoing, the present invention enables efficient maintenance and management of the plural information equipment functioning under the network environment.

Also the user can effectively utilize the contract result and use history of the image forming apparatus constituting the object of the current or prior contract in the contract of the image forming apparatus constituting the object of a new contract. Also the present invention allows to provide a user interface capable of effectively and efficiently manage the contract for the plural information equipment.

What is claimed is:

1. A management system, for managing contracts for a plurality of printing apparatuses, comprising:
    a first reception unit that receives a first ID for specifying a first printing apparatus for which a contract has been made and a second ID for specifying a second printing apparatus as an apparatus to be newly managed, the first ID and the second ID being transmitted via the communication line, and the first printing apparatus and the second printing apparatus being different from each other;
    a second reception unit that receives a user instruction indicating whether or not a contract for the second printing apparatus is to be made based on the contract for the first printing apparatus in case of replacing the first printing apparatus by the second printing apparatus;
    a search unit that searches for first information related to the contract corresponding to the first ID received by said first reception unit, when said second reception unit receives the user instruction indicating that the contract for the second printing apparatus is to be made based on the contract for the first printing apparatus; and
    a generation unit that generates second information related to the contract for the second printing apparatus, based on the first information searched for by said search unit and machine types of the first and second apparatuses,
    wherein said generation unit generates third information related to a new contract regardless of the printing apparatus managed in the past, when said second reception unit receives the user instruction indicating that the contract for the second printing is not be made based on the contract for the first printing apparatus,
    wherein the contracts are related to a charge amount for printing per sheet in the plurality of printing apparatuses,
    wherein said generation unit determines a discounted charge based on the past use history of said first printing apparatus and transmits the contract content based on said discounted charge to the first reception unit,
    wherein said generation unit generates the second information based on a charge condition determined in accordance with the machine types of the first and second printing apparatuses, and
    responsive to a determination that the machine type of the first printing apparatus is a printer and the machine type of the second printing apparatus is a copier, the charge condition is determined such that the charge amount for printing per sheet in the contract for the second printing apparatus is discounted as compared to that in the contract for the first printing apparatus.

2. A system according to claim 1, wherein the contract is further related to contract term and maintenance of the printing apparatus.

3. A system according to claim 1, wherein said generation unit further generates display information for displaying the generated second information, and wherein said system further comprises a transmission unit that transmits the display information generated by said generation unit via a communication line.

4. A system according to claim 1, wherein the machine type of the first printing apparatus is a color printer and the machine type of the second printing apparatus is a monochromatic copier.

5. A system according to claim 1, wherein the machine type of the first printing apparatus is a color printer and the machine type of the second printing apparatus is a monochromatic printer.

6. A management method, for use in a management system that is connect to a communication line, for managing contracts for a plurality of printing apparatuses, comprising:
    a first reception step, of receiving a first ID for specifying a first printing apparatus for which a contract has been made and a second ID for specifying a second printing apparatus as an apparatus to be newly managed, the first ID and the second ID being transmitted via the communication line, and the first printing apparatus and the second printing apparatus being different from each other;
    a second reception step, of receiving a user instruction indicating whether or not a contract for the second printing apparatus is to be made based on the contract for the first printing apparatus in case of replacing the first printing apparatus by the second printing apparatus;
    a search step, of searching for first information related to the contract corresponding to the first ID received by said first reception unit, when said second reception unit receives the user instruction indicating that the contract for the second printing apparatus is to be made based on the contract for the first printing apparatus; and
    a generation step, of generating second information related to the contract for the second printing apparatus, based on the first information searched for by said search unit and machine types of the first and second apparatuses,
    wherein said generation step includes generating third information related to a new contract regardless of the printing apparatus managed in the past, when the user instruction indicating that the contract for the second printing is not be made based on the contract for the first printing apparatus is received in said second reception step,
    wherein the contracts are related to a charge amount for printing per sheet in the plurality of printing apparatuses,
    wherein said generation step includes determining a discounted charge based on the past use history of said first printing apparatus and transmitting the contract content based on said discounted charge to the first reception unit, wherein said generation step includes generating the second information based on a charge condition determined in accordance with the machine types of the first and second printing apparatuses, and responsive to a determination that the machine type of the first printing apparatus is a printer and the machine type of the second printing apparatus is a copier, the charge condition is determined such that the charge amount for printing per sheet in the contract for the second printing apparatus is discounted as compared to that in the contract for the first printing apparatus.

7. A method according to claim 6, wherein the contract is further related to contract term and maintenance of the printing apparatus.

8. A method according to claim 6, wherein said generation step further includes generating display information for displaying the generated second information, and said method further comprising a transmission step, of transmitting the display information generated in said generation step via a communication line.

9. A method according to claim 6, wherein the machine type of the first printing apparatus is a color printer and the machine type of the second printing apparatus is a monochromatic copier.

10. A method according to claim 6, wherein the machine type of the first printing apparatus is a color printer and the machine type of the second printing apparatus is a monochromatic printer.

11. A computer-readable storage medium, encoding a program for causing a computer to perform a management method, for use in a management system that is connected to a communication line, for managing contracts for a plurality of printing apparatuses, said method comprising:

a first reception step, of receiving a first ID for specifying a first printing apparatus for which a contract has been made and a second ID for specifying a second printing apparatus as an apparatus to be newly managed, the first ID and the second ID being transmitted via the communication line, and the first printing apparatus and the second printing apparatus being different from each other;

a second reception step, of receiving a user instruction indicating whether or not a contract for the second printing apparatus is to be made based on the contract for the first printing apparatus in case of replacing the first printing apparatus by the second printing apparatus;

a search step, of searching for first information related to the contract corresponding to the first ID received by said first reception unit, when said second reception unit receives the user instruction indicating that the contract for the second printing apparatus is to be made based on the contract for the first printing apparatus; and a generation step, of generating second information related to the contract for the second printing apparatus, based on the first information searched for by said search unit and machine types of the first and second apparatuses, wherein said generation step includes generating third information related to a new contract regardless of the printing apparatus managed in the past, when the user instruction indicating that the contract for the second printing is not be made based on the contract for the first printing apparatus is received in said second reception step, wherein the contracts are related to a charge amount for printing per sheet in the plurality of printing apparatuses, wherein said generation step includes determining a discounted charge based on the past use history of said first printing apparatus and transmitting the contract content based on said discounted charge to the first reception unit, wherein said generation step includes generating the second information based on a charge condition determined in accordance with the machine types of the first and second printing apparatuses, and responsive to a determination that the machine type of the first printing apparatus is a printer and the machine type of the second printing apparatus is a copier, the charge condition is determined such that the charge amount for printing per sheet in the contract for the second printing apparatus is discounted as compared to that in the contract for the first printing apparatus.

* * * * *